(12) United States Patent
Yamazaki et al.

(10) Patent No.: US 7,487,608 B2
(45) Date of Patent: Feb. 10, 2009

(54) WALK-BEHIND SELF-PROPELLED SNOW REMOVING MACHINE

(75) Inventors: Nobuo Yamazaki, Wako (JP); Kiyomi Yanai, Wako (JP); Toshiaki Kawakami, Wako (JP); Norikazu Shimizu, Wako (JP); Tsutomu Wakitani, Wako (JP)

(73) Assignee: Honda Motor Co., Ltd. (JP)

( * ) Notice: Subject to any disclaimer, the term of this patent is extended or adjusted under 35 U.S.C. 154(b) by 162 days.

(21) Appl. No.: 11/493,275

(22) Filed: Jul. 26, 2006

(65) Prior Publication Data

US 2007/0022634 A1 Feb. 1, 2007

(30) Foreign Application Priority Data

| Jul. 29, 2005 | (JP) | ............................. 2005-220773 |
| Jul. 29, 2005 | (JP) | ............................. 2005-221291 |
| Jul. 29, 2005 | (JP) | ............................. 2005-221602 |
| Aug. 1, 2005 | (JP) | ............................. 2005-223492 |
| Aug. 9, 2005 | (JP) | ............................. 2005-230706 |

(51) Int. Cl.
*E01H 5/09* (2006.01)
*E02F 5/00* (2006.01)

(52) U.S. Cl. .............................. 37/245; 37/254; 37/382; 701/50

(58) Field of Classification Search ................... 37/246, 37/245, 254, 244, 382, 414; 701/50; 318/432
See application file for complete search history.

(56) References Cited

U.S. PATENT DOCUMENTS

| 5,651,241 | A * | 7/1997 | Wegner ....................... 56/11.2 |
| 6,742,290 | B2 * | 6/2004 | Hanafusa ...................... 37/248 |
| 6,798,160 | B2 * | 9/2004 | Wakitani et al. ............ 318/432 |
| 7,100,312 | B2 * | 9/2006 | Wakitani et al. .............. 37/246 |
| 7,155,847 | B2 * | 1/2007 | Kuroiwa et al. ............... 37/261 |
| 7,305,778 | B2 * | 12/2007 | Wakitani et al. .............. 37/245 |
| 7,328,762 | B2 * | 2/2008 | Kanke et al. ............... 180/19.3 |
| 2003/0000190 | A1 * | 1/2003 | Busboom et al. ............. 56/10.8 |
| 2003/0085680 | A1 * | 5/2003 | Wakitani et al. ............ 318/432 |
| 2004/0238239 | A1 * | 12/2004 | Wakitani et al. ............. 180/6.5 |
| 2005/0019173 | A1 * | 1/2005 | Wakitani et al. ............ 417/313 |

(Continued)

FOREIGN PATENT DOCUMENTS

JP 0332617 3/1991

(Continued)

*Primary Examiner*—Thomas A Beach
(74) *Attorney, Agent, or Firm*—Adams & Wilks

(57) ABSTRACT

A walk-behind self-propelled working machine has a machine body, a working unit mounted on the machine body to perform a working operation, an engine mounted on the machine body to drive the working unit, and a traveling unit mounted on the machine body and drivable to cause the machine body to travel. A control unit controls operations of the working unit and the traveling unit. An operating section is operatable by a human operator to provide signals to the control unit to control operations of the working unit and the traveling unit. A mode selector switch is mounted on the operating section for operation by the human operator to select one working operation mode from among plural alternative working operation modes that are set in advance in the control unit on the basis of a combination of a travel speed of the machine body, a revolving speed of the engine, and an opening of a throttle valve associated with the engine.

14 Claims, 24 Drawing Sheets

U.S. PATENT DOCUMENTS

2005/0039353 A1* 2/2005 Hanafusa et al. ............... 37/242
2005/0088122 A1* 4/2005 Wakitani et al. ............... 318/66
2005/0088123 A1* 4/2005 Wakitani et al. ............... 318/67
2005/0090949 A1* 4/2005 Wakitani et al. ............... 701/22
2005/0097785 A1* 5/2005 Wakitani et al. ............... 37/242

FOREIGN PATENT DOCUMENTS

JP     00054335     2/2000
JP     05042310     2/2005

* cited by examiner

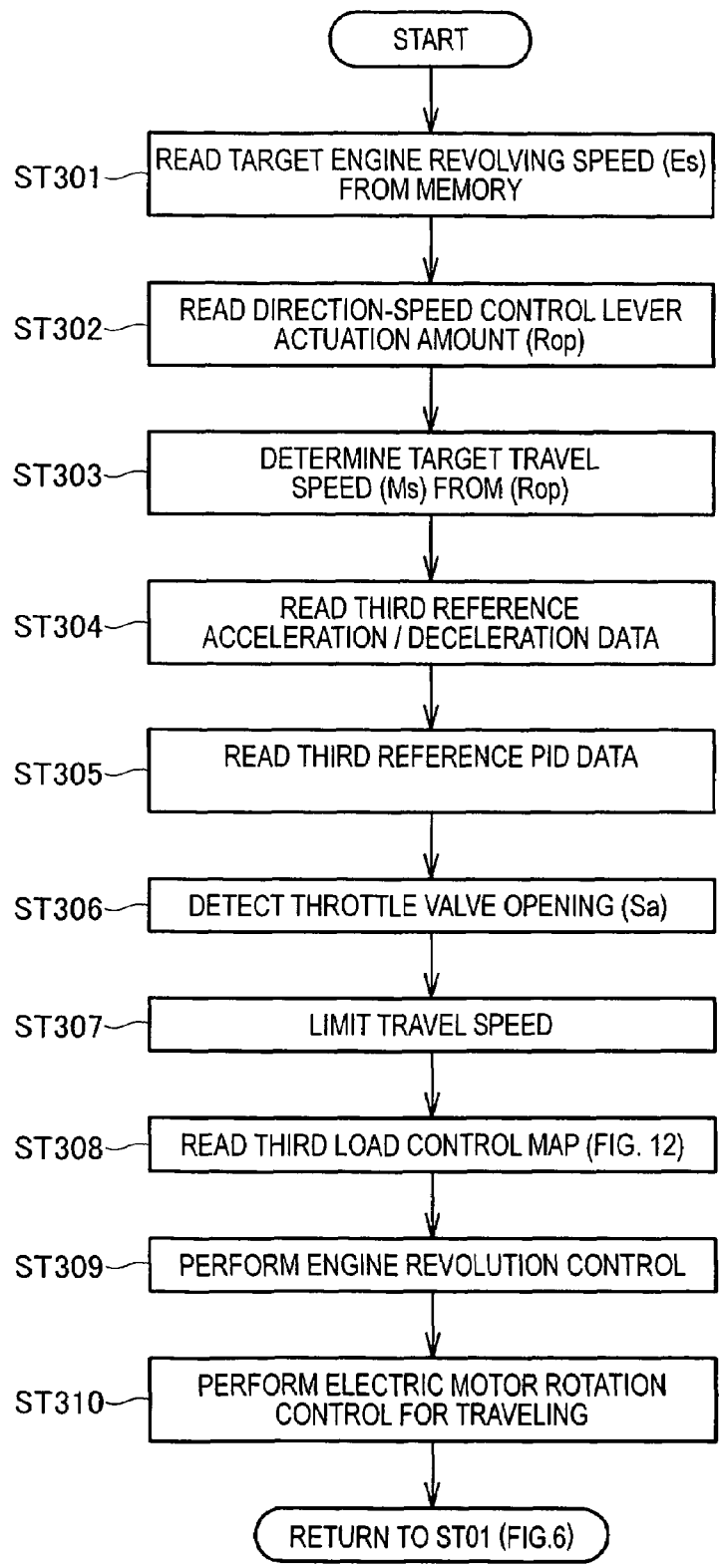

WALK-BEHIND SELF-PROPELLED SNOW REMOVING MACHINE

FIELD OF THE INVENTION

The present invention relates to a walk-behind self-propelled snow removing machine having an engine-driven snow removing unit disposed at the front end of a machine body, a travel unit drivable for causing the machine body to travel in a desired direction, and left and right operation handlebars extending rearward from the machine body so that a human operator can control operations of the snow removing unit and the travel unit while walking behind the snow removing machine with the handlebars being gripped with its hands.

BACKGROUND OF THE INVENTION

Walk-behind self-propelled snow removing machines of the type concerned are known as disclosed, for example, in Japanese Patent Publication (JP-A) No. 2000-54335. As shown in FIG. 27 hereof, the disclosed snow removing machine 220 includes an operating section 221 mounted to extend between left and right handlebars 222L and 222R. The operating section 221 comprises an operation board, which is provided with a throttle lever 223 for adjustably controlling the throttle opening of an engine 224, a direction-speed control lever 225 for adjustably setting a travel direction and a travel speed of a machine body 226, and a multifunction lever 227 for controlling roll and pivot of a snow removing unit 228 and on-off (engaging and disengaging) operation of left and right clutches (now shown) disposed between the engine 224 and left and right travel units 229L and 229R.

During snow removing operation, the load on the snow removing unit 228 may vary due, for example, to variations in the physical nature and properties of piled snow to be removed. For instance, when the load on the snow removing unit 228 increases, the revolving speed of the engine 224 and the travel speed of the machine body 226 are cause to drop. In this instance, a human operator may recognize an increase in the load on the snow removing unit 228 by sensing a decrease in the travel speed of the snow removing machine 220. To avoid undue drop in the travel speed, which may result in an inefficient snow removing operation, the human operator, upon sensing of a reduction in the travel speed, shifts the throttle lever 223 in a direction to increase the throttle opening of the engine 224 to thereby increase the engine revolving speed (engine power). Since shifting of the throttle lever depending on the sensitive ability of the human operator occurs frequently during the snow removing operation, the efficiency and finishing quality of the snow removing operation rely largely on the skill of the human operator.

According to improvements proposed heretofore, the revolving speed of the engine and the travel speed of the sow removing machine are controlled to vary with a change in the load on the snow removing unit. The proposed improvements are not fully satisfactory in terms of the operability and user-friendliness of the operating section as well as the efficiency of the snow removing operation. Typical examples of the prior improvements are disclosed in Japanese Utility Model Laid-open Publication (JP-U-A) No. 3-32617 and Japanese Patent Laid-open Publication (JP-A) No. 2005-42310.

Accordingly, an object of the present invention is to provide a walk-behind self-propelled snow removing machine, which is easy to use for all human operators irrespective of their skill levels, highly user-friendly, and capable of achieving a snow removing operation efficiently with good finishing quality.

SUMMARY OF THE INVENTION

According to the present invention, there is provided a walk-behind self-propelled snow-removing machine comprising: a machine body having a front end and a rear end; a snow-removing unit disposed at the front end of the machine body for performing a snow removing operation; an engine disposed on the machine body for driving the snow-removing unit; a traveling unit disposed on the machine body and drivable for causing the machine body to travel; left and right operation handlebars extending upwardly and rearwardly from a rear portion of the machine body, the operation handlebars being disposed one on each side of a longitudinal centerline of the machine body; a control unit for controlling operations of the snow removing unit and the traveling unit; an operating section mounted to extend between the left and right operation handlebars for operation by a human operator to provide instructions to the control unit; a snow-removing-unit posture control member disposed on the operating section at one side of the longitudinal centerline of the machine body for operation by the human operator to control a posture of the snow removing unit; a travel ready lever pivotally mounted on one of the left and right operation handlebars at the other side of the longitudinal centerline of the machine body for being gripped by the human operator to place the machine body in a ready-to-travel condition, the travel ready lever, when released from gripping by the human operator, automatically placing the machine body in an unable-to-travel condition; and a mode selector switch disposed on the operating section and located forwardly of the travel ready lever for operation by the human operator to select one snow removing operation mode from among plural alternative snow removing operation modes that are set in advance in the control unit on the basis of a travel speed of the machine body, a revolving speed of the engine, and an opening of a throttle valve associated with the engine taken in combination.

With the mode selector switch thus provided, it is possible to set the plural alternative snow removing operation modes to be best suited for skilled human operators, semiskilled human operators and unskilled human operators. Thus the snow removing machine is highly user-friendly.

The snow removing machine may further include an adjusting member disposed on the operating section and located near the mode selector switch for operation by the human operator to adjust power from the engine and a snow throwing distance of the snow removing unit. By thus arranging the adjusting member and the mode selector switch closely with each other, it is readily possible to interlock the respective functions of the adjusting member and the mode selector switch to thereby improve the operability of the operating section. This will increase the efficiency of the snow removing operation. In one preferred form of the invention, the adjusting member is disposed between the mode selector switch and the travel ready lever when viewed in a longitudinal direction of the machine body.

Preferably, the plural alternative snow removing operation modes comprise a first control mode in which control is performed through manual operation by the human operator based on the revolving speed of the engine, a second control mode in which control is performed so that the travel speed of the machine body decreases moderately with respect to an increase in the opening of the throttle valve, and a third control mode in which control is performed so that the travel speed of the machine body decreases with respect to an increase in the opening of the throttle valve at a greater extent than as achieved in the second control mode. The first control mode is a "manual" control mode and is best suited for use by skilled humane operators. The second control mode is a "power" or "semiautomatic" control mode and is best suited for use by semiskilled human operators. The third control mode is an "automatic" control mode and is best suited for use by unskilled human operators.

In one preferred form, the first control mode is arranged so that the rate of decrease of the travel speed of the machine body is set to increase with a decrease in the revolving speed of the engine. The second control mode is arranged so that the rate of decrease of the travel speed of the machine body, which increases with an increase in the opening of the throttle valve, is set to be smaller in a first throttle opening range defined between a fully closed position and a partly open first intermediate position disposed between the fully closed position and a fully open position of the throttle valve, than in a second throttle opening range defined between the first intermediate position and the fully open position of the throttle valve. The third control mode is arranged so that the rate of decrease of the travel speed of the machine body, which increases with an increase in the opening of the throttle valve, is set to be larger in a first throttle opening range defined between the fully closed position and a partly open second intermediate position disposed between the fully closed position and a fully open position of the throttle valve, than in a second throttle opening range defined between the second intermediate position and the fully open position of the throttle valve.

When used by the skilled human operator, the first control mode may provide the operators with a higher degree of freedom in operating the snow removing machine. When used by the semiskilled operators, the second control mode may achieve a snow removing operation speedily and efficiently. Even when used by the unskilled operators, the third control mode enables the unskilled operator to perform a snow removing operation with utmost ease and good finishing quality.

The walk-behind self-propelled snow-removing machine may further include a battery for supplying electric power to the travel unit, in which instance the plural alternative snow removing operation modes selectable by the mode selector switch preferably include a fourth control mode in which control is performed so that the travel unit is operated only by electric power supplied from the battery while the engine is in a deactivated state. The fourth control mode when selected provides lower fuel cost, prolonged engine service life, and low-noise traveling of the snow removing machine.

In one preferred form of the invention, the control unit has a function to deactivate the engine or keep a deactivated state of the engine only if a main switch of the snow removing machine has been shifted to an ON position to activate all electric systems of the snow removing machine, and the operation mode has been shifted to the fourth control mode through manual operation of the mode selector switch by the human operator. The control unit may further have a function to automatically activate the engine when the operation mode is shifted from the fourth control mode to another control mode by means of the mode selector switch. Preferably, the main switch further has a START position to instruct the control unit to activate the engine, and wherein the control unit further has a function to activate the engine only if the operation mode has been shifted from the fourth control mode to another control mode by means of the mode selector switch and the main switch has been shifted to the START position.

With the main switch thus arranged, the human operator is able to acknowledge with certainty a change of the mode from the fourth control mode to another control mode.

Preferably, the operating section includes a direction-speed control lever manually operable to undergo reciprocating movement between a forward travel position and a reverse travel position past a neutral position for adjustably setting a travel direction and a travel speed of the machine body, and a drive-instruction switch manually operable to provide an instruction to the control unit for enabling transmission of power from the engine to the snow removing unit. The mode selector switch is manually operable to select an automatic position to perform automatic setting of the revolving speed of the engine and the travel speed of the machine body or a manual position to allow the human operator to perform manual setting of the revolving speed of the engine and the travel speed of the machine body. The control unit has a function to increase the revolving speed of the engine up to a snow-removing operation range if the mode selector switch has been set in the automatic position, the direction-speed control lever has been shifted from the neutral position toward the forward travel position, and the drive-instruction switch is in the ON state.

With the mode selector switch set in the automatic position to perform automatic control of the revolving speed of the engine and the travel speed of the machine body, the engine revolving speed is increased up to the snow-removing operation range automatically when the drive-instruction switch is activated with the direction-speed control lever set in a forward travel position. Thus, the snow removing machine 10 starts traveling forward while driving the snow removing unit by the engine running at a higher speed in the snow-removing operation range. In this instance, however, since the control does not require a separate operation by the human operator to shift the throttle lever in a direction to enlarge the throttle opening, the snow removing operation can be achieved with improved efficiency.

In one preferred form of the invention, the function of the control unit to increase the revolving speed of the engine up to the snow-removing operation range is disabled if the travel ready lever is released from gripping by the human operator. By thus disabling the engine speed increasing function of the control unit 61, it is possible to save the fuel cost and extend the service life of the engine.

BRIEF DESCRIPTION OF THE DRAWINGS

Certain preferred embodiments of the present invention will hereinafter be described in detail, by way of example only, with reference to the accompanying drawings, in which:

FIG. 11 is a flowchart showing a subroutine executed to achieve a third control mode shown in FIG. 6;

DETAILED DESCRIPTION OF THE PREFERRED EMBODIMENTS

Figure 1:
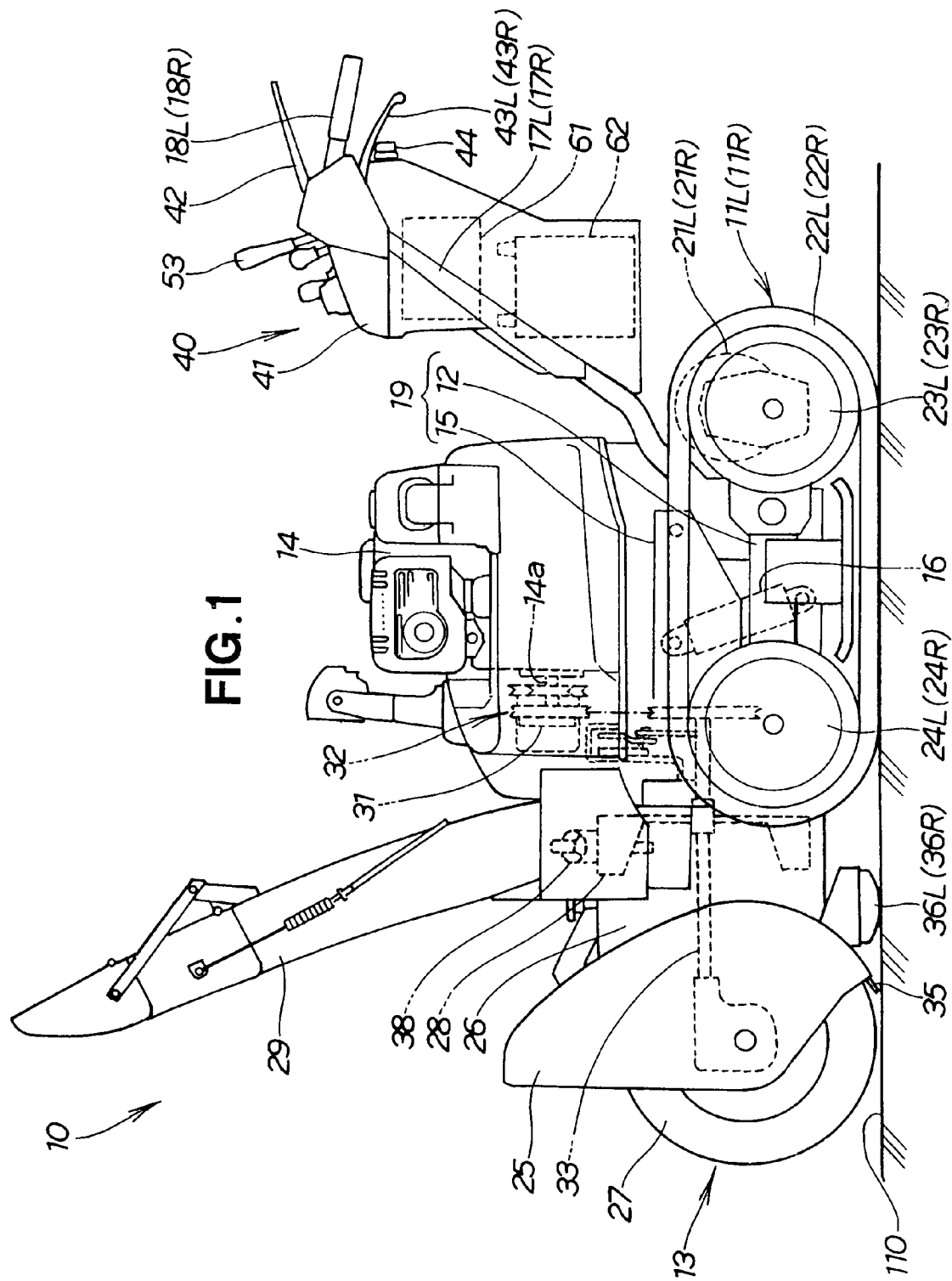
FIG. 1 is a side view of a walk-behind self-propelled snow removing machine according to an embodiment of the present invention.

Referring now to the drawings and FIG. 1 in particular, there is shown in left side view a snow removing machine 10 according to an embodiment of the present invention. The snow removing machine 10 is of the so-called walk-behind self-propelled type, which includes a travel frame 12 equipped with left and right travel units 11L and 11R, a body frame 15 equipped with a snow removing unit 13 and an internal combustion engine 14, and left and right operation handlebars 17L and 17R extending rearwardly and upwardly from a rear portion of the body frame 15. The body frame 15 has a rear end portion pivotally connected to the travel frame 12 and a front end portion adapted to be moved up and down by a pivot drive mechanism 16 so that upon actuation of the pivot drive mechanism 16, the body frame 15 including the snow removing unit 13 is caused to pivotally move up and down about the rear end portion of the body frame 15. The operation handlebars 17L, 17R have left and right handgrips 18L and 18R at distal or free ends thereof for being gripped by a human operator. During a snow removing operation, the human operator manipulates operating members in an operating section (described later) while walking behind the snow removing machine, in order to control operations of the snow removing unit 13 and the travel units 11L, 11R.

Figure 2:
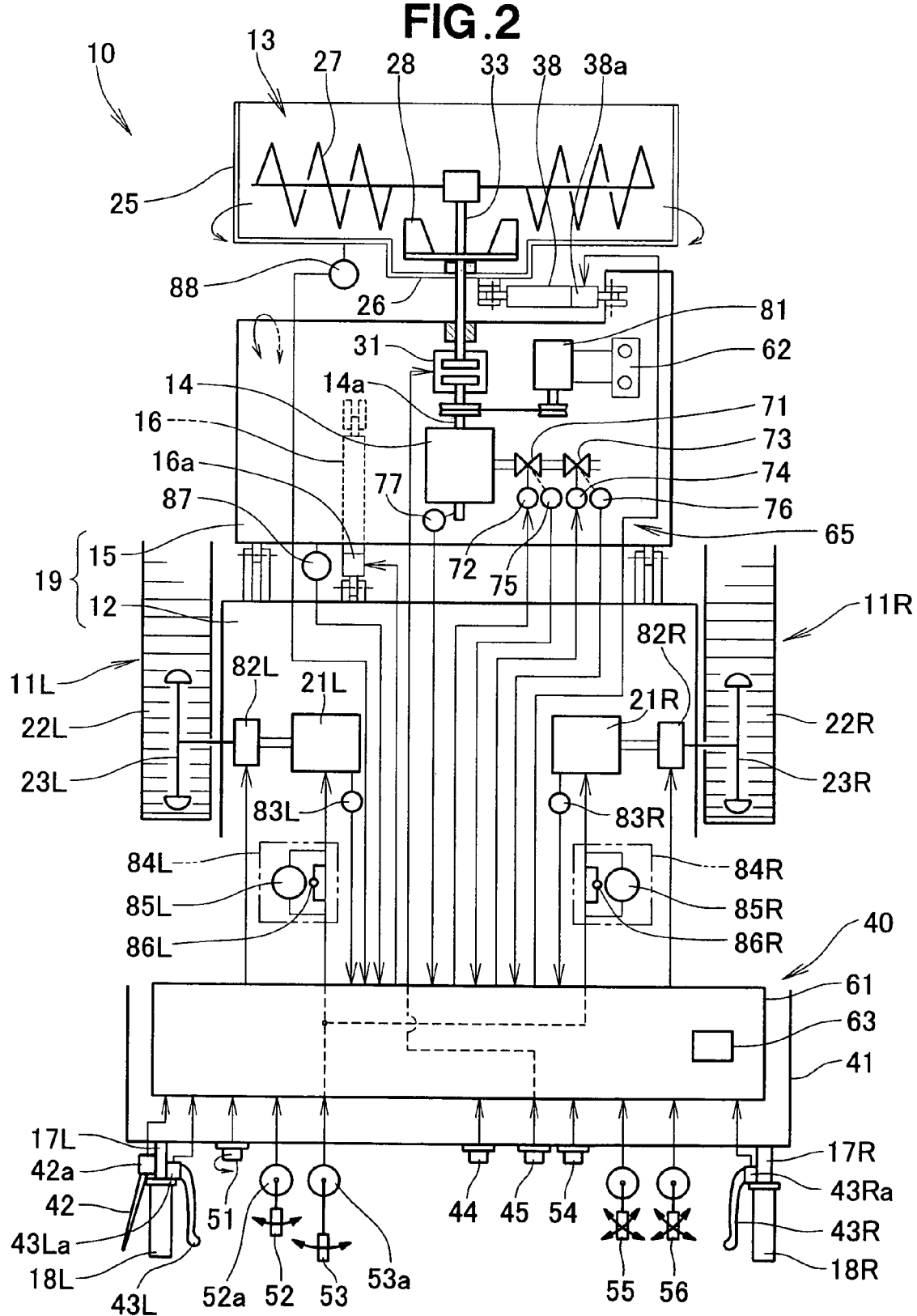
FIG. 2 is a diagrammatical top plan view of the snow removing machine, showing the general configuration of a control system.

The travel frame 12 and the body frame 15 together form a machine body 19. As shown in FIGS. 1 and 2, the travel frame 12 is provided with left and right electric motors 21L and 21R for driving the left and right travel units 11L, 11R, respectively. Each of the travel units 11L, 11R includes a driving wheel 23L, 23R rotatably mounted on a rear end portion of the travel frame 12, an idler wheel 24L, 24R freely rotatably mounted on a front end portion of the travel frame 12, and a crawler belt 22L, 22R trained between the driving wheel 23L, 23R and the idler wheel 24L, 24R. The left electric motor 21L is coupled to the left driving wheel 23L so that the left crawler belt 22L can be driven by power transmitted from the left electric motor 21L via the left driving wheel 23L. Similarly, the right electric motor 21R is coupled to the right driving wheel 23R so that the right crawler belt 22R can be driven by power transmitted from the right electric motor 21R through the right driving wheel 23R.

The snow removing unit 13 comprises an auger 27 rotatably disposed in an auger housing 25, a blower 28 rotatably disposed in a blower casing 26 formed integrally with a rear wall of the auger housing 25, and a shooter 29 disposed on an outlet portion of the blower casing 26. The auger housing 25 includes a scraper 35 disposed on a lower end thereof, and left and right sleds 36L and 36R disposed behind the scraper 36.

As shown in FIG. 1, the engine 14 is provided to operate as a power source for driving the snow removing unit 13 via an electromagnetic clutch 31 and a power transmitting mechanism 32. The electromagnetic clutch 31 is coupled with a crankshaft 14a of the engine 14. The power transmitting mechanism 32 comprises a belt drive mechanism for transmitting power from the electromagnetic clutch 31 to an auger transmission shaft 33. The auger transmission shaft 33 is connected to drive the auger 27 and the blower 28. With this arrangement, power from the engine 14 is transmitted, successively through the crankshaft 14a, the electromagnetic clutch 31 and the auger transmission shaft 33, to the auger 27 and the blower 28 of the snow removing unit 13. The auger 27 gathers snow, piled up on the ground, toward a center of the snow removing machine 10, and the blower 28 receives and throws the gathered snow to desired positions around the machine 10 through the shooter 29.

The pivot drive mechanism 16 comprises an electrohydraulic cylinder actuator having a piston reciprocally movable to project from and retract into a cylinder body under the action of a hydraulic pressure created within the cylinder body by a hydraulic pump driven by an electric motor 16a (FIG. 2) built in a side of the cylinder body as a drive source. One of the piston and the cylinder body of the electrohydraulic cylinder actuator (pivot drive mechanism) 16 is connected to the travel frame 12, and the other of the piston and the cylinder body is connected to the body frame 15.

The auger housing 25 and the blower casing 26 are movably mounted on the body frame 15 so that they can roll about an axis of the auger transmission shaft 33 relative to the body frame 15 by means of a roll drive mechanism 38 (FIG. 2). To this end, the auger transmission shaft 33 extending in a front-to-rear or longitudinal direction of the machine 10 is rotatably supported by or journaled on the auger housing 25 and the blower casing 26, and the blower casing 26 is rotatably mounted on a front end portion of the body frame 15 for rolling movement relative to the body frame 15.

Furthermore, since the body frame 15 is pivotally connected to the travel frame 12 as previously discussed, the auger housing 25 can not only move up and down but also roll left and right relative to the travel frame 12. The roll drive mechanism 38 comprises an electrohydraulic cylinder actuator having a piston reciprocally movable to project from and retract into a cylinder body under the action of a hydraulic pressure created within the cylinder body by a hydraulic pump driven by an electric motor 38a (FIG. 2) built in a side of the cylinder body as a drive source. One of the piston and the cylinder body of the electrohydraulic cylinder actuator (roll drive mechanism) 38 is connected to the body frame 15 and the other of the piston and the cylinder body is connected to the blower casing 26 which is formed integrally with the auger housing 25.

The snow removing machine 10 also includes an operating section 40, a control unit 61 and a battery 62 that are disposed between the left and right operation handlebars 17L and 17R and arranged vertically one below another in the order named.

Figure 3:
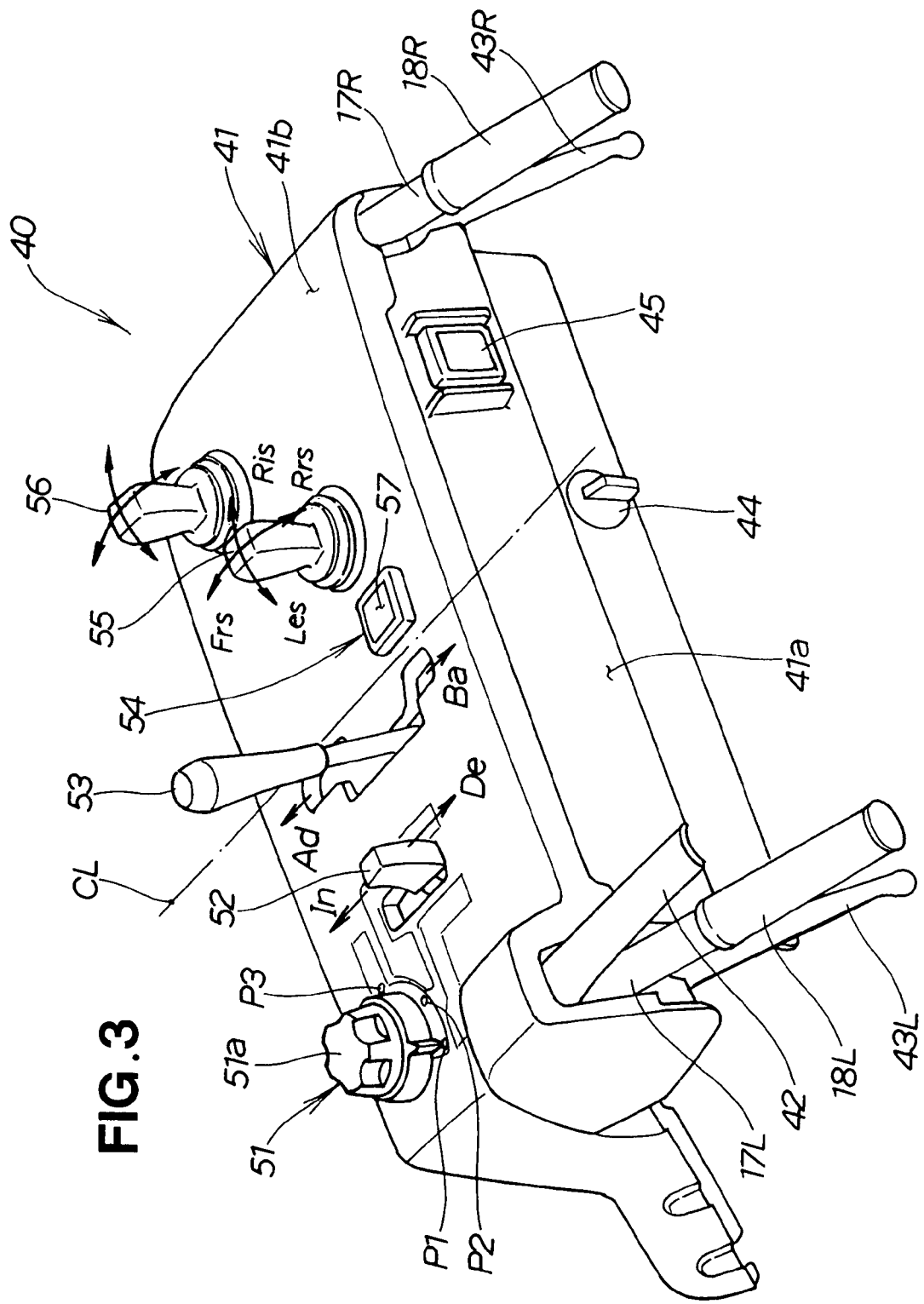
FIG. 3 is a perspective view showing an operating section of the snow removing machine.
Figure 4:
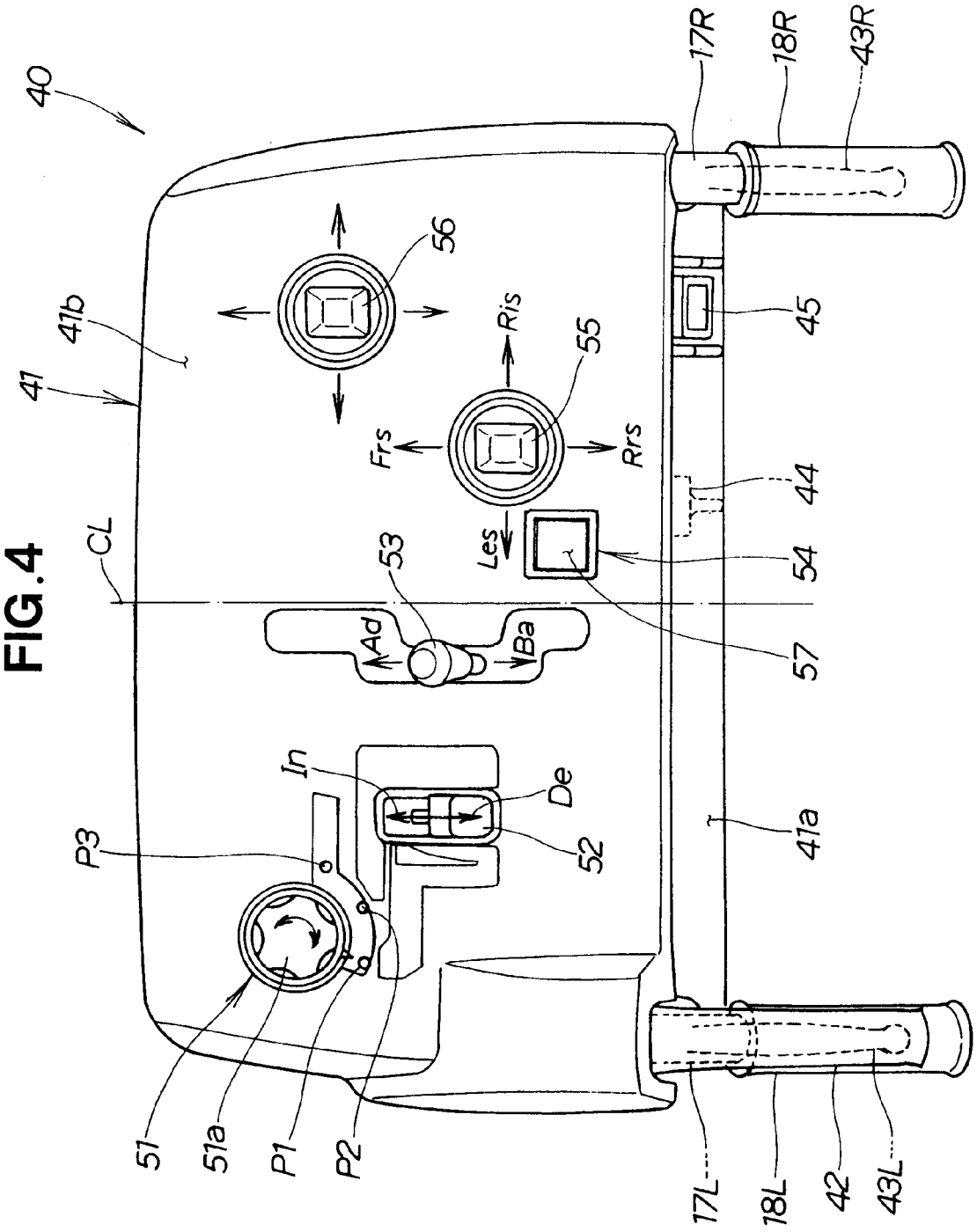
FIG. 4 is a plan view of the operating section.

As shown in FIGS. 3 and 4, the operating section 40 includes a console box 41 mounted to extend between the left and right operation handlebars 17L and 17R, a travel ready lever (deadman's lever) 42 and a left turn control lever 43L that are pivotally mounted on the left operation handlebar 17L adjacent to the left handgrip 18L, and a right turn control lever 43R pivotally mounted on the right operation handlebar 17R adjacent to the right handgrip 18R. In the illustrated embodiment, the travel ready lever 42 is disposed directly above the left handgrip 18L, and the left and right turn control levers 43L and 43R are disposed directly below the left and right handgrips 18L and 18R, respectively.

The travel ready lever (deadman's lever) 42 is arranged to actuate a switch 42a (FIG. 2) associated therewith. The switch 42a will be referred to as "travel ready switch". Under the force or bias of a return spring (not shown) acting between the travel ready lever 42 and the left operation handlebar 17L, the travel ready lever 42 is normally disposed in an inoperative position shown in FIG. 3 where the lever 42 is spaced upwardly far away from the left handgrip 18L and the travel ready switch 42a is in an OFF state. When the human operator while gripping the left handgrip 18L forces the travel ready lever 42 downward toward the left handgrip 18L against the bias of the return spring, the travel ready switch 42a is turned on by the travel ready lever 42. When the force or pressure on the travel ready lever 42 is released, the travel ready lever 42 is allowed to return to its original inoperative position of FIG. 3 by the force of the non-illustrated return spring, whereupon the travel ready switch 42a is turned off.

The left and right turn control levers 43L and 43R are arranged to actuate turn switches 43La and 43Ra (FIG. 2) associated respectively therewith. By the force or bias of a non-illustrated return spring, each of the left and right turn control levers 43L, 43R is normally disposed in an inoperative position shown in FIG. 3 where the turn control lever 43L, 43R is spaced downward far away from the corresponding handgrip 18L, 18R and the associated switch 43La, 43Ra is in an OFF state. When the human operator grips the left turn control lever 43L together with the left handgrip 18L, the left turn control lever 43L is pulled upward toward the left handgrip 18L against the bias of the return spring, whereupon the left turn switch 43La is turned on by the left turn control lever 43L. Similarly, the right turn switch 43Ra is turned on or activated when the right turn control lever 43R is pulled upward toward the right handgrip 18R against the bias of the return spring as the human operator grips the right turn control lever 43R together with the right handgrip 18R. When the upward pulling force or pressure on each respective turn control lever 43L, 43R is released, the turn control lever 43L, 43R is allowed to return to its original inoperative position of FIG. 3 under the force of the return spring, causing the associated turn switch 43La, 43Ra to be turned off.

As shown in FIG. 3, the console box 41 has, on its rear or operator-side surface 41a (i.e., a surface facing the human operator), a main switch 44 and an auger switch (also called "clutch operating switch" or "drive-instruction switch") 45. The main switch 44 is a rotary switch having at least two positions, i.e., an ON position and an OFF position, selectable by turning a knob in arcs. When the main switch 44 is turned on or activated, it starts the engine 14 to run. The main switch 44 may have three positions, i.e., an OFF position, an ON position, and a START position, like conventional vehicle ignition key switch. The auger switch 45 is a pushbutton switch with maintained action manually operable to engage and disengage the electromagnetic clutch 31. The auger switch 45 when activated sends a signal to the control unit 61, instructing the control unit 61 to enable transmission of power from the engine 14 to the snow removing unit 13. Thus, the auger switch 45 serves as a drive-instruction switch.

On an upper surface 41B of the console box 41, there are provided, from left to right in FIG. 3, a mode selector switch 51, a throttle lever (adjusting member) 52, a direction-speed control lever 53, a reset switch 54, an auger housing posture control lever (snow-removing-unit posture control member) 55 and a shooter control lever 56. The mode selector switch 51, the throttle lever 52 and the direction-speed control lever 53 are disposed on a left side of a longitudinal centerline CL of the snow removing machine 10 with the direction-speed control lever 53 located adjacent to the longitudinal centerline CL. On the other hand, the reset switch 54, the auger housing posture control lever 55 and the shooter control lever 56 are disposed on a right side of the longitudinal centerline CL with the reset switch 54 located adjacent to the longitudinal centerline CL.

The mode selector switch 51 is a manually operable multiposition switch arranged to select alternative travel control modes (snow removing operation modes) to be set in the control unit 61. In the illustrated embodiment, the mode selector switch 51 comprises a rotary switch having a knob 51a manually operable to undergo angular movement about its own axis between a first control position P1, a second control position P2 and a third control position P3 that are arranged in the named order as viewed in a counterclockwise direction shown in FIG. 3. The mode selector switch 51 has three switching positions corresponding respectively to the first, second and third control positions P1, P2 and P3 of the knob 51a. At the respective switching positions, the mode selector switch 51 generates different switch signals.

The alternative travel control modes that can be selected by the mode selector switch 51 are determined according to the skill of a human operator engaged in the snow removing operation and conditions of snow to be removed. More specifically, the first control position P1 is a "MANUAL" position in which the engine revolving speed, throttle opening, and travel speed of the snow removing machine can be set manually by a human operator. The second control position P2 is a "POWER" position in which the engine revolving speed and the throttle opening can be set manually by a human operator, while the travel speed is set automatically irrespective of the desire of the human operator. In this "POWER" position, the human operator is allowed to change the snow throwing distance at its own judgment. The third control position P3 is an "AUTO" position in which the engine revolving speed, throttle opening and travel speed are automatically set.

When the mode selector switch 51 is switched to assume the first control position P1 (i.e., "MANUAL" position), it sends a switch signal to the control unit 61, instructing the latter to perform control operation in a first control mode. Similarly, when switched to assume the second control position P2 (i.e., "POWER" position), the mode selector switch 51 sends a switch signal to the control unit 61, instructing the latter to perform control operation in a second control mode. When the mode selector switch 51 is switched to assume the third control position P3 (i.e., "AUTO" position), it sends a switch signal to the control unit 61, instructing the latter to perform control operation in a third control mode. The first, second and third control mode operations will be described later in detail.

The throttle lever 52 is an adjusting member, which is manually operable by a human operator to adjust engine power through control of the opening of a throttle valve 71 (FIG. 2) achieved by a control motor 72 (FIG. 2) incorporated in an electronic governor 65 (FIG. 2). The throttle lever 52 can be moved by the human operator in a front-and-rear direction (longitudinal direction) of the snow removing machine, as indicated by arrows In and De, between a foremost position (full-throttle position) and a rearmost position (zero-throttle position). The throttle lever 52 is connected to a potentiometer 52a so that the potentiometer 52a produces an output electric potential or voltage corresponding to a current position of the throttle lever 52. When the throttle lever 52 is in the foremost full-throttle position, the throttle valve 71 is fully opened, and when the throttle lever 52 is in the rearmost zero-throttle position, the throttle valve 71 is fully closed. By thus controlling the opening of the throttle valve 71, the number of revolutions of the engine 14 (or the engine revolving speed) can be adjusted.

The direction-speed control lever 53 is an operating member, which is provided to control the direction and speed of the electric motors 21L, 21R, as will be described in greater detail with reference to FIG. 5.

The reset switch 54 is provided to restore the original posture of the auger housing 25. In the illustrated embodiment, the reset switch 54 comprises a manual pushbutton switch having a pilot lamp 57. When the reset switch 54 is depressed, the auger housing 25 is caused to restore its preset original posture.

The auger housing posture control lever 55 is an operating member, which is provided to control the posture of the auger housing 25 according to the condition of a surface of snow. In the illustrated embodiment, the auger housing posture control lever 55 comprises a joystick, fore-and-aft motion of which operates the pivot drive mechanism 16 to pivot the auger housing 25 up and down while lateral motion operates the roll drive mechanism 38 to roll the auger housing 25 leftward and rightward. The joystick (auger hosing posture control lever) 55 is provided with four electric switches (not shown) arranged so that they are turned on or activated when the joystick 55 is operated to tilt in a forward direction Frs, a rearward direction Rrs, a leftward direction Les and a rightward direction Ris, respectively.

The shooter operating lever 56 is an operating member, which is provided to change the orientation of the shooter 29 (FIG. 1). The shooter operating lever 56 in the illustrated embodiment also comprises a joystick.

Figure 5:
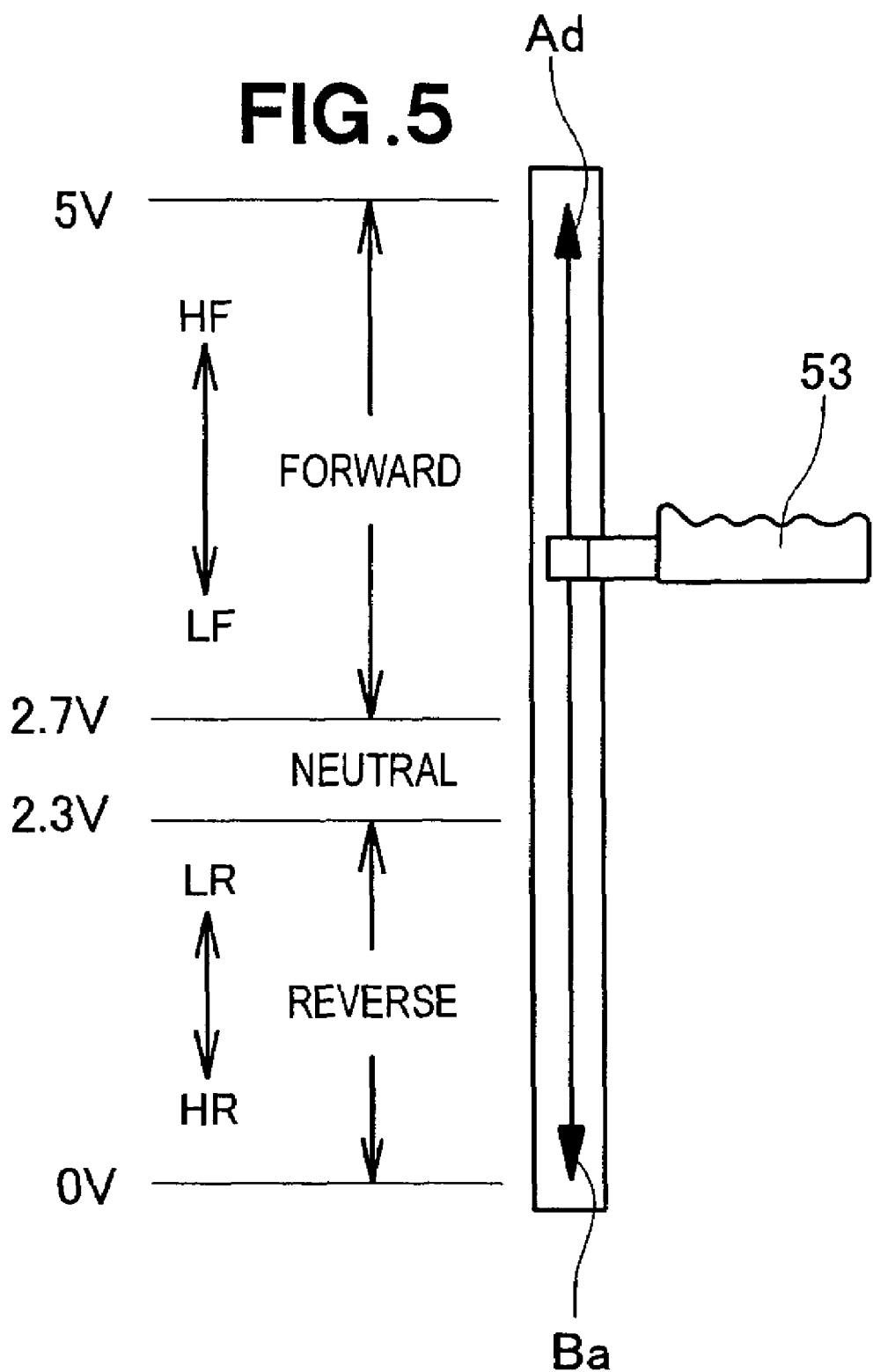
FIG. 5 is a diagrammatical view illustrative of the operation of a direction-speed control lever of the operating section.

FIG. 5 diagrammatically shows operation of the direction-speed control lever 53 of the snow removing machine. As shown in this figure, the direction-speed lever 53 is manually operable to move fore and aft through three consecutive ranges "FORWARD", "NUTRAL", and "REVERSE". The direction-speed lever 53 is normally disposed in a neutral position within the "NEUTRAL" range and when it is shifted from the neutral position toward the "FORWARD" range, as indicated by the arrowhead Ad, the snow removing machine 10 (FIG. 1) can move or travel in a forward direction. Alternatively, when the direction-speed lever 53 is shifted from the neutral position toward the "REVERSE" range, the snow removing machine 10 can move or travel in a reverse or backward direction. Furthermore, by moving the direction-speed control lever 53 fro and aft within the "FORWARD" range, it is possible to adjustably change the forward travel speed of the snow removing machine 10 between a high speed Hf and a low speed Lf. Similarly, the backward travel speed of the snow removing machine 10 can be adjustably changed between a low speed Lr and a high speed Hr by shifting the direction-speed control lever 35 fore and aft within the "REVERSE" range.

In the illustrated embodiment, voltages corresponding to the various positions of the direction-speed control lever 53 are generated via the potentiometer 53a (FIG. 2) in such a manner that 0 V corresponds to a maximum backward travel speed, 5 V corresponds to a maximum forward travel speed, and 2.3V to 2.7 V corresponds to the neutral range. In this way, the single direction-speed control lever 53 can adjustably set both direction and the speed of travel of the snow removing machine 10.

Referring back to FIG. 2, a control system of the snow removing machine will be described. The control system is consolidated by the control unit 61. The control unit 61 has a storage device or memory 63 incorporated therein for storing various sorts of information. The control unit 61 operates to perform various controls based on desired items of information read out or retrieved from the memory 63, as will be described below.

First, operation of the snow removing unit 13 will be described. The engine 14 has an intake system including the throttle valve 71 controlled in opening and closing operation by the control motor 72 of the electronic governor 65, and a choke valve 73 controlled in opening and closing operation by a control motor 74 of the electronic governor 65. The electronic governor 65 and the control unit 61 are linked such that based on signals supplied from the control unit 61, the electronic governor 65 operates the respective control motors 72, 74 to automatically control the opening of the throttle valve 71 and the opening of the choke valve 73. The opening of the throttle valve 71 is detected by a throttle position sensor 75, while the opening of the choke valve 73 is detected by a choke position sensor 76. Detected signals indicative of the openings of the throttle valve 71 and the choke valve 73 are supplied from the corresponding position sensors 75, 76 to the control unit 61.

Revolving speed (number of revolutions) of the engine 14 is detected by an engine speed sensor 77. A detected signal from the engine speed sensor 77 is supplied to the control unit 61.

When the engine 14 is running, the output from the engine 14 is partially used to drive or rotate a generator 81. Electric power thus produced by the generator 81 is supplied to a battery 62, the left and right electric motors 21L and 21R, and other electric equipment of the snow removing machine 10. The remaining portion of the output from the engine 14 is supplied via the electromagnetic clutch 31 to the auger 27 and the blower 28 for rotation thereof.

Once the human operates activate the auger switch 45 while gripping the travel ready lever (deadman's lever) 42, the electromagnetic clutch 31 is brought to an engaged state so that the auger 27 and the blower 28 are driven to rotate by the power of the engine 14. The electromagnetic clutch 31 is brought back to a disengaged state when the human operator either releases a grip on the travel ready lever (deadman's lever) 42 to thereby allow the lever 42 to return to its original or free position, or alternatively again depresses the auger switch 45.

Next, operation for the travel units 11L and 11R will be described. The snow removing machine 10 includes left and right electromagnetic brakes 82L and 82R that function like parking brakes of conventional motor vehicles. Stated more specifically, the respective rotating shafts of the left and right electric motors 21L, 21R are kept braked by the electromagnetic brakes 82L and 82R. During parking of the snow removing machine 10, the electromagnetic brakes 82L, 82R are in a braking state under control of the control unit 61. The electromagnetic brakes 82L, 82R can be brought to a non-braking or released state in the following manner.

The electromagnetic brakes 82L, 82R are placed in the released state once the direction-speed control lever 53 is shifted to a forward or backward travel position while the main switch 44 is in the ON state and the travel ready lever (deadman's lever) 42 is being gripped by the human operator. The control unit 61, on the basis of information about the position of the direction-speed control lever 53 received from the potentiometer 53a, drives the left and right electric motors 21L and 21R to rotate via left and right motor drivers 84L and 84R and performs feedback control on the basis of detected signals from motor speed sensors 83L and 83R so that rotating speeds of the respective electric motors 21L, 21R assume predetermined values. As a consequence, the left and right driving wheels 23L, 23R can rotate in desired directions and at desired speeds.

Braking operation during traveling of the snow removing machine 10 will be achieved in the following manner. Each of the motor drivers 84L and 84R includes a regenerating brake circuit 85L, 85R and a short-circuiting brake circuit 86L, 86R. The short-circuiting brake circuit 86L, 86R constitutes a braking means.

While the left turn control lever 43L is gripped by the human operator together with the left handgrip 18L so as to keep the associated turn switch 43La in the ON state, the control unit 61, on the basis of a switch-on signal from the turn switch 43La, activates the left regenerating brake circuit 85L to lower the rotating speed of the left electric motor 21L. Similarly, when the right turn control lever 43R is being gripped by the human operator together with the right handgrip 18R so as to keep the associated turn switch 43Ra in the ON state, the control unit 61, on the basis of a switch-on signal from the turn switch 43Ra, activates the right regenerating brake circuit 85R to thereby lower the rotating speed of the right electric motor 21R. Thus, the snow removing machine 10 turns left only while the left turn control lever 43L is gripped by the human operator together with the left handgrip 18L, while the snow removing machine 10 turns right only while the right turn control lever 43R is gripped by the human operator together with the right handgrip 18R.

Then, the snow removing machine 10 can be caused to stop traveling by either releasing the travel ready lever (deadman's lever) 42, shifting the main switch 44 back to the OFF position, or shifting the direction-speed control lever 53 back to the neutral position.

When the auger housing posture control lever or joystick 55 is pivotally moved fore and aft, the electric motor 16a of the pivot drive mechanism 16 rotates forward and reverse directions to thereby reciprocate the piston to project from and retract into the cylinder body of the electrohydraulic cylinder actuator of the pivot drive mechanism 16. As a consequence, the auger housing 25 and the blower casing 26 are pivotally moved up and down. The vertical position of the auger housing 25 is detected by an auger height sensor 87 and a detected signal from the auger height sensor 87 is supplied to the control unit 61.

When the auger housing posture control lever or joystick 55 is pivotally moved left and right, the electric motor 38a of the roll drive mechanism 38 rotates forward and reverse directions to thereby reciprocate the piston to project from and retract into the cylinder body of the electromagnetic cylinder actuator of the roll drive mechanism 38. As a consequence, the auger housing 25 and the blower casing 26 are caused to roll left and right about the longitudinal centerline CL (FIG. 4) of the snow removing machine 10. The rolling position of the auger housing 25 is detected by a rolling position sensor 88 and a detected signal from the rolling position sensor 88 is supplied to the control unit 61.

Referring now to FIGS. 6 to 12, a description will be given about an embodiment of control performed by the control unit 61 under the condition that the direction-speed control lever 53 is in the "FORWARD" range and the auger switch 45 is in the ON state for the purpose of achieving a snow removing operation with the snow removing unit 13 while the snow removing machine 10 is traveling in the forward direction. The control unit 61 comprises a microcomputer and the control sequence achieved by the microcomputer is initiated once the main switch 44 has been shifted from the OFF position to the ON position and terminated when the main switch is shifted back to the OFF position.

Figure 6:
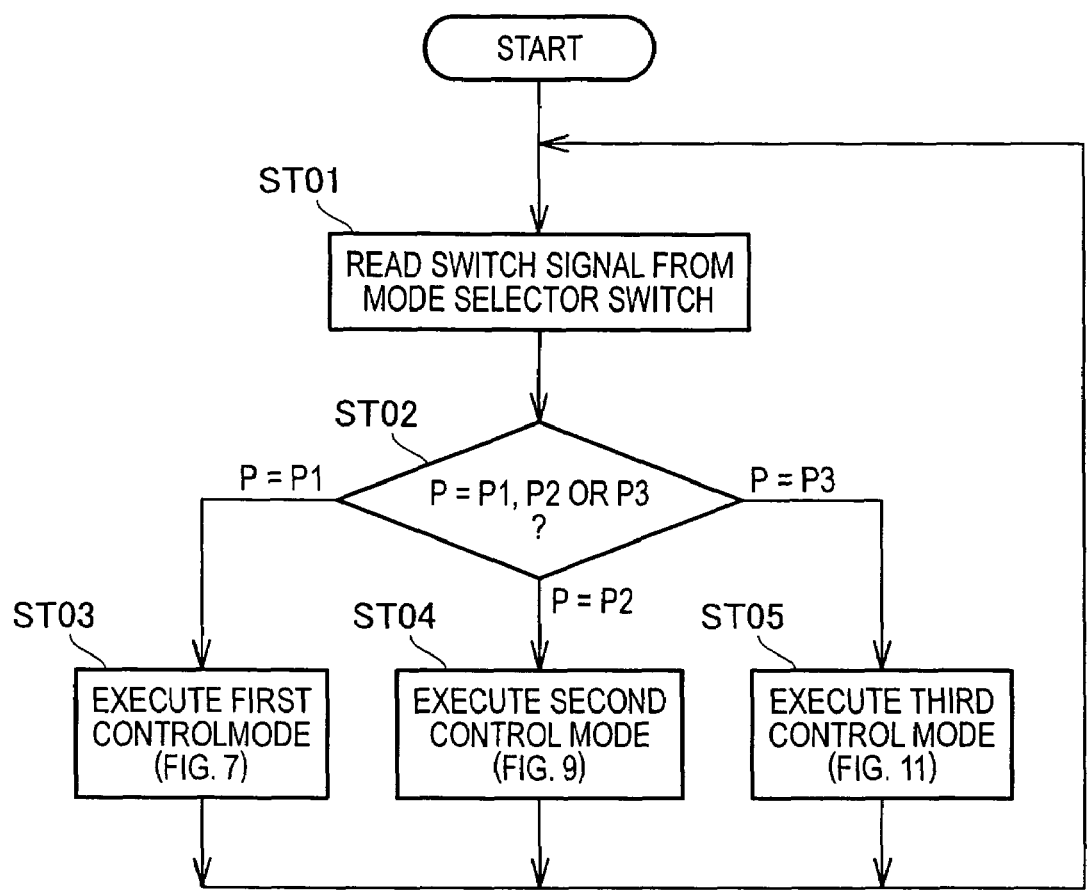
FIG. 6 is a flowchart showing a main control routine executed in a control unit of the snow removing machine for controlling operations of an engine and electric motors for driving a snow removing unit and travel units, respectively, of the snow removing machine.

FIG. 6 is a flowchart showing a main routine performed by the control unit 61 to control the engine 14 and the electric motors 21L and 21R of the snow removing machine 10.

Step ST01 of FIG. 6 reads a switch signal from the mode selector switch 51. Then, step ST02 determines a current position P of the mode selector switch 51. If the current position P is the first control position P1, the control goes on to a step ST03. If the current position P is the second control position P2, the control advances to a step ST04. Alternatively, if the current position P is the third control position P3, the control goes on to a step ST05.

Step ST03 executes a first control mode for the purpose of controlling the engine 14 and the electric motors 21L and 21R. After execution, the control returns to step ST01. The way of executing the first control mode will be described later with reference to FIGS. 7 and 8.

Step ST04 executes a second control mode for the purpose of controlling the engine 14 and the electric motors 21L and 21R. After execution, the control returns to step ST01. The way of executing the second control mode will be described later with reference to FIGS. 9 and 10.

Step ST05 executes a third control mode for the purpose of controlling the engine 14 and the electric motors 21L and 21R. After execution, the control returns to step ST01. The way of executing the third control mode will be described later with reference to FIGS. 11 and 12.

Figure 7:
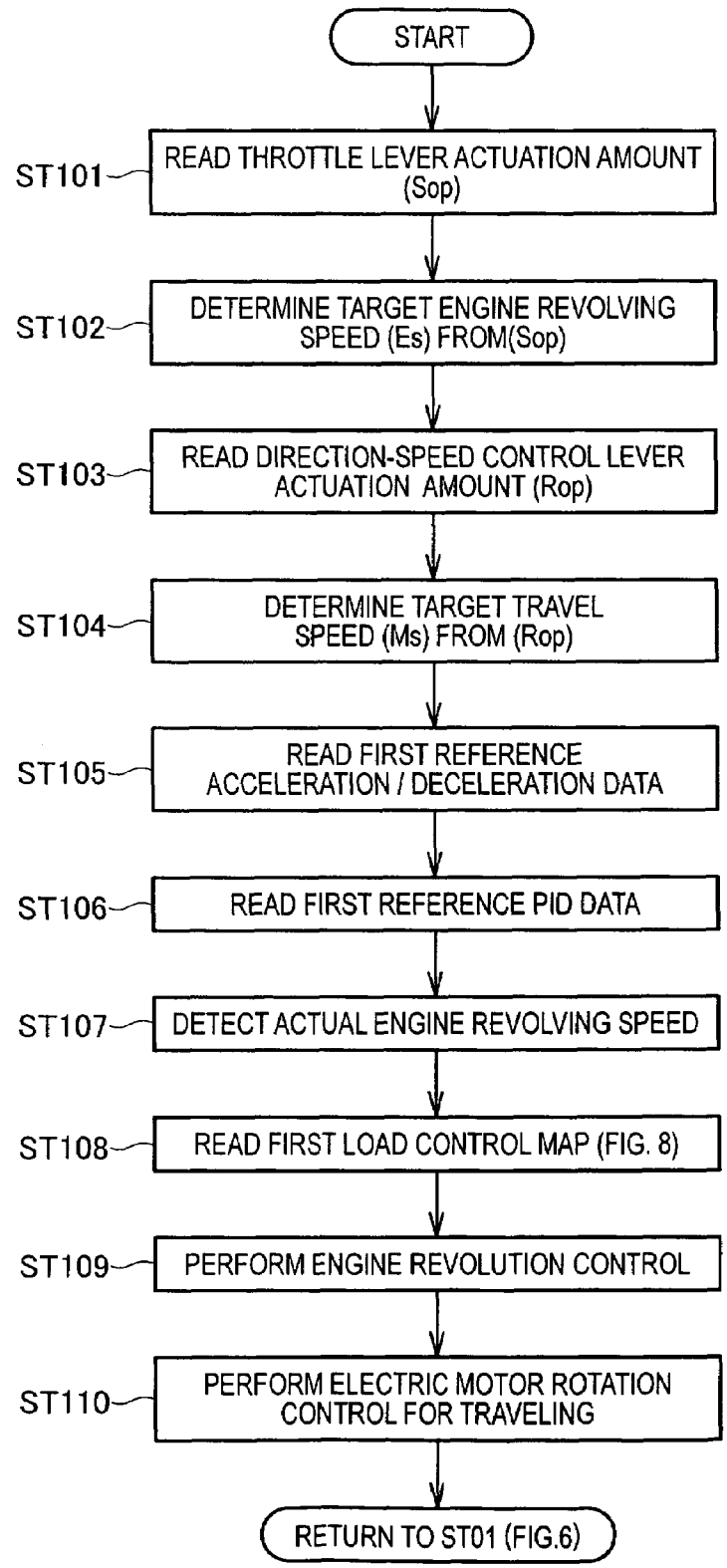
FIG. 7 is a flowchart showing a subroutine executed to achieve a first control mode shown in FIG. 6.

FIG. 7 is a flowchart showing a subroutine performed by the control unit 61 to execute the first control mode (step ST03 of FIG. 6) for controlling operations of the engine 14 and the electric motors 21L and 21R.

Step ST101 of FIG. 7 reads an amount of actuation (Sop) of the throttle lever 52, which is represented by a voltage value output from the potentiometer 52a in accordance with the current position of the throttle lever 52. Then, step ST102 determines a target engine revolving speed (Es) from the throttle lever actuation amount (Sop).

Subsequently, step ST103 reads an amount of actuation (Rop) of the direction-speed control lever 53, which is represented by a voltage value output from the potentiometer 53a in accordance with the current position of the direction-speed control lever 53. Thereafter, step ST104 determines from the direction-speed control lever actuation amount (Rop) a target travel speed (Ms) for the electric motors 21L and 21R that are provided for the traveling of the snow removing machine 10.

Then, step ST105 selectively reads out or retrieves data about a first reference acceleration and a first reference deceleration stored in the memory 63. The first reference acceleration is a constant that is used as a reference for performing acceleration control of the electric motors 21L and 21R. Similarly, the first reference deceleration is a constant used to perform deceleration control of the electric motors 21L and 21R.

Subsequently, step ST106 selectively reads out or retrieves data about a first reference PID from the memory 63. The first reference PID is a PID constant which is used as a reference for performing PID control of rotating speeds of the electric motors 21L and 21R.

Then, step ST107 detects an actual number of revolutions Ne of the engine 14 (i.e., actual engine revolving speed) by reading an output signal from the engine speed sensor 77.

Figure 8:
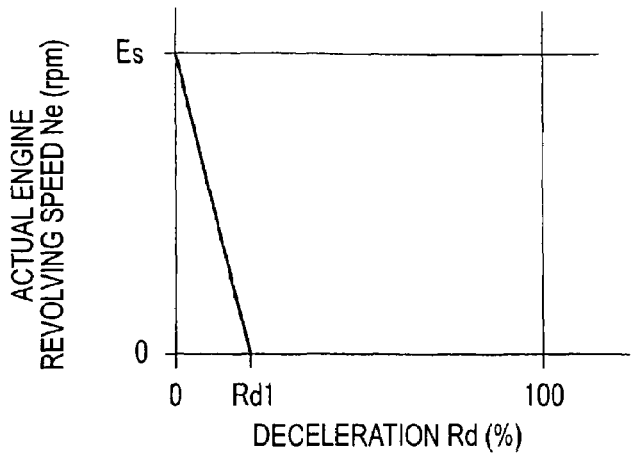
FIG. 8 is a view showing a load control map used in the first control mode.

Subsequently, step ST108 selectively reads out or retrieves a first load control map from the memory 63. The first load control map, as shown in FIG. 8, represents a correspondence established between the actual engine revolving speed Ne (rpm) on the Y-axis and the deceleration Rd (%) of the travel units 11L and 11R on the X-axis. The term "deceleration Rd" is intended to refer to the rate of decrease of rotating speed of the electric motors 21L and 21R (i.e., the rate of decrease of travel speed of the travel units 11L and 11R) and also is called "deceleration correction factor". If Mnr represents an actual rotating speed of the electric motors 21L and 21R, the actual rotating speed Mnr slows down by a deceleration Rd. More specifically, a rotating speed Mdr of the electric motors 21L and 21R after deceleration can be obtained by the following expression.

$$Mdr = Mnr \times (100 - Rd)/100$$

Performance characteristics of the first load control map are represented by a linear or straight line, which is drawn to establish a correlation between the actual engine revolving speed Ne and the deceleration Rd such that when Ne is equal to the target engine revolving speed Es, Rd is 0%, and when Ne drops to 0 rmp, Rd is Rd1%. The Rd1 is set to have a relatively small value. With the first load control map thus prepared, the deceleration of rotating speed of the electric motors 21L and 21R (i.e., the deceleration of travel speed of the travel units 11L and 11R) slightly increases with a decrease in the actual engine revolving speed Ne.

Especially when the snow removing machine 10 is traveling with the electric motors 21L and 21R operating at an actual rotating speed Mnr, a deceleration Rd=0% does not cause any deceleration of rotating speed of the electric motors 21L and 21R so that a rotating speed after deceleration Mdr is equal to Mnr. Alternatively, if Rd=Rd1%, Mdr=Mnr×(100−Rd1)/100. Furthermore, if Rd=100%, Mdr=0, which means that rotating speed of the electric motors 21L and 21R reduces to 0, thus stopping traveling of the snow removing machine 10.

Referring back to FIG. 7, step ST108 is followed by step ST109 where the revolving speed of the engine 14 is controlled according to the target engine revolving speed Es. At the next step ST110, rotating speeds of the electric motors 21L and 21R are controlled on the basis of the target travel speed Ms, first reference acceleration or deceleration, first reference PID, and first load control map (FIG. 8). The motor rotating speed control is performed in such a manner that when the actual engine revolving speed Ne shows a decrease with respect to the target engine revolving speed Es, the rotating speed of the electric motors 21L and 21R i.e., the travel speed of the travel units 11L and 11R) is slowed down according to the first load control map shown in FIG. 8. Subsequent to the motor rotating speed control performed at step ST110, the control returns to step ST03 shown in FIG. 6.

Figure 9:
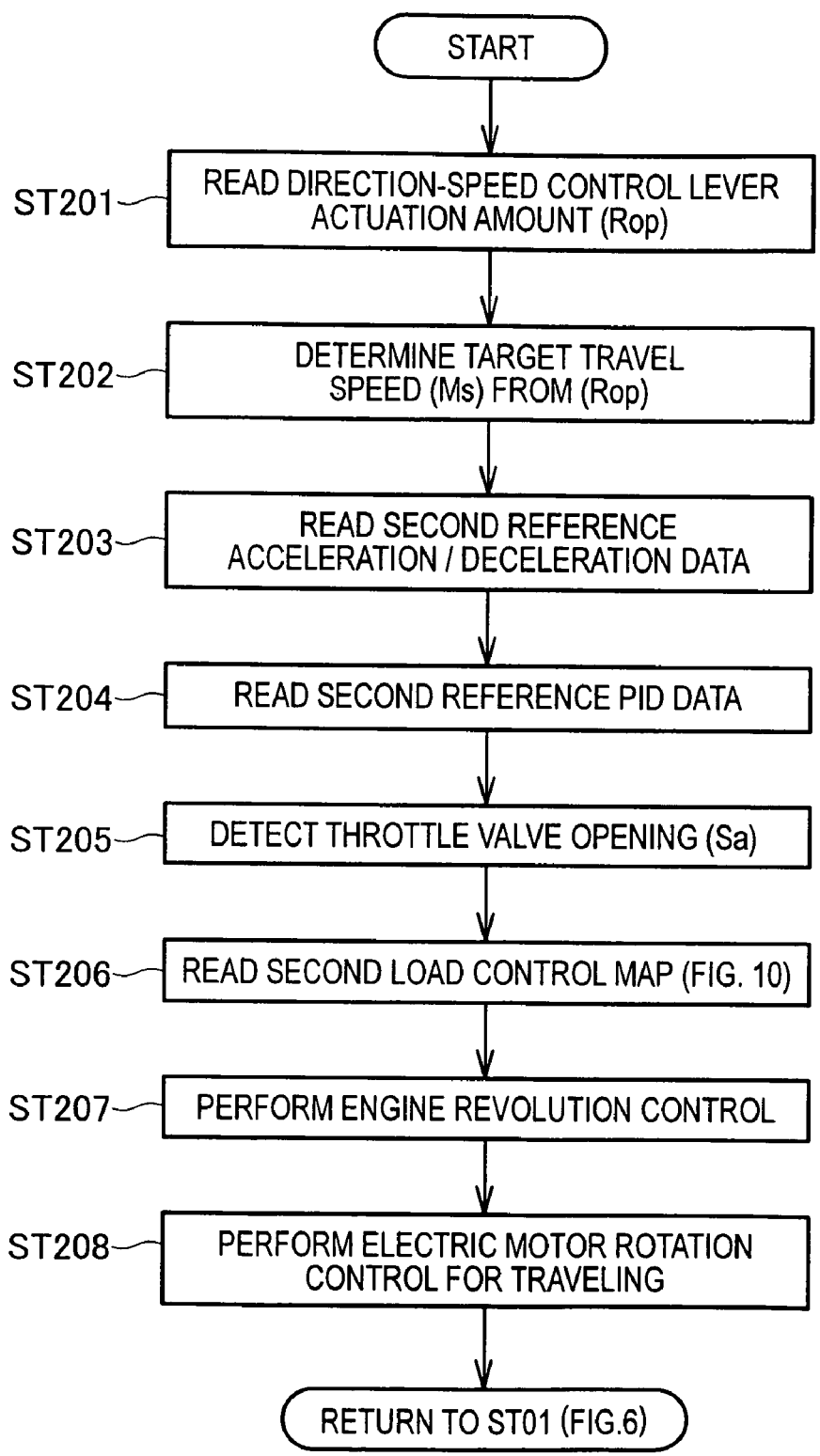
FIG. 9 is a flowchart showing a subroutine executed to achieve a second control mode shown in FIG. 6.

FIG. 9 is a flowchart showing a subroutine performed by the control unit 61 to execute the second control mode (step ST04 of FIG. 6) for controlling operations of the engine 14 and the electric motors 21L and 21R.

Step ST201 of FIG. 9 reads an amount of actuation (Rop) of the direction-speed control lever 53, and at the next step ST202, a target travel speed Ms of the electric motors 21L and 21R is determined from the direction-speed control lever actuation amount (Rop).

Then, step ST203 selectively reads out or retrieves data about a second reference acceleration and a second reference deceleration stored in the memory 63. The second reference acceleration is a constant that is used as a reference for performing acceleration control of the electric motors 21L and 21R. Similarly, the second reference deceleration is a constant used to perform deceleration control of the electric motors 21L and 21R.

Subsequently, step ST204 selectively reads out or retrieves data about a second reference PID from the memory 63. The second reference PID is a PID constant which is used as a reference for performing PID control of rotating speeds of the electric motors 21L and 21R.

Then, step ST205 detects an opening Sa of the throttle valve 71 by reading an output signal from the throttle position sensor 75.

Figure 10:
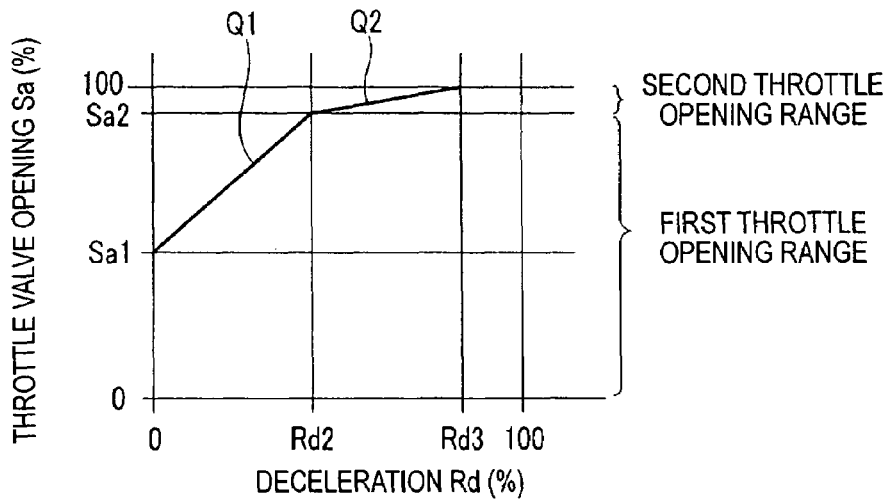
FIG. 10, appearing with FIG. 8, is a view showing a load control map used in the second control mode.

Subsequently, step ST206 selectively reads out or retrieves a second load control map from the memory 63. The second load control map, as shown in FIG. 10, represents a correspondence established between the opening Sa (%) of the throttle valve 71 on the Y-axis and the deceleration Rd (%) of the travel units 11L and 11R on the X-axis. The throttle valve opening Sa has a first range defined between the fully closed position (Sa=0%) and a partly open intermediate position (Sa=Sa2%) located between the fully closed position and the fully open position (Sa=100%) of the throttle valve 71, and a second range defined between the intermediate position and the fully open position of the throttle valve 71. The intermediate position is located near the fully open position. The second load control map has performance characteristics represented by a line bent upward at an intermediate position thereof. The performance characteristic line of the second load control map is determined such that the rate of decrease (i.e., deceleration) Rd of rotating speed of the electric motors 21L and 21R (i.e., the deceleration Rd of travel speed of the travel units 11L and 11R), which increases with an increase in the throttle valve opening Sa, is set to be smaller in the first throttle-valve opening range than in the second throttle-valve opening range.

Stated more specifically, the deceleration Rd of rotating speed of the electric motors 21L and 21R (i.e., the deceleration of travel speed of the travel units 11L and 11R) is set in such a manner that Rd is to be 0% while the throttle valve opening Sa increases from 0% to Sa1%, Rd is to be Rd2% when Sa is Sa2%, and Rd is to be Rd3% when Sa is 100%, where Sa1 is smaller than Sa2, Rd2 is smaller than Rd3, and Rd3 is smaller than 100%.

In that part of the first throttle-valve opening range extending between Sa1% and Sa2%, the performance characteristic line of the second load control map has a steeper or greater gradient (as indicated by a first line segment Q1) than as it is in the second throttle-valve opening range extending between Sa2% and 100% (as indicated by a second line segment Q2).

As discussed above, in the first throttle-valve opening range defined between the fully closed position (Sa=0%) and the partly open intermediate position (Sa=Sa2%) of the throttle valve 71, the deceleration Rd of rotating speed of the electric motors 21L and 21R (i.e., the deceleration of travel speed of the travel units 11L and 11R) is set to increase with an increase in the throttle valve opening Sa at a first rate. In the second throttle-valve opening range defined between the partly open intermediate position (Sa=Sa2%) and the fully open position (Sa=100%) of the throttle valve 71, the deceleration Rd of rotating speed of the electric motors 21L and 21R is set to increase with an increase in the throttle valve opening Sa at a second rate which is larger than the first rate as achieved in the first throttle-valve opening range.

When the actual revolving speed Ne of the engine 14 is caused to drop due to an increase in the load on the snow removing unit 13, the opening Sa of the throttle valve 71 is increased. In this instance, according to the second load control map, the rotating speed of the electric motors 21L and 21R (i.e., the travel speed of the travel units 11L and 11R) decreases moderately as compared to an increase in the throttle valve opening Sa.

Referring back to FIG. 9, step ST206 is followed by step ST207 where the revolving speed of the engine 14 is controlled according to the target engine revolving speed Es. At the next step ST208, the rotating speeds of the electric motors 21L and 21R are controlled on the basis of the target travel speed Ms, second reference acceleration or deceleration, second reference PID, and second load control map (FIG. 10). The motor rotating speed control is performed in such a manner that when the actual engine revolving speed Ne decreases with an increase in the load, the rotating speed of the electric motors 21L and 21R, namely, the travel speed of the travel units 11L and 11R is slowed down according to the second load control map shown in FIG. 10. After the control of rotating speed of the electric motors 21L and 21R at step ST208, the control returns to step ST04 shown in FIG. 6.

FIG. 11 is a flowchart showing a subroutine performed by the control unit 61 to execute the third control mode (step ST05 of FIG. 6) for controlling operations of the engine 14 and the electric motors 21L and 21R.

Step ST301 of FIG. 11 reads out or retrieves a target revolving speed Es of the engine 14 from the memory 63. Then, step ST302 reads an amount of actuation (Rop) of the direction-speed control lever 53, and at the next step ST303, a target travel speed Ms of the electric motors 21L and 21R is determined from the direction-speed control lever actuation amount (Rop).

Then, step ST304 selectively reads out or retrieves data about a third reference acceleration and a third reference deceleration stored in the memory 63. The third reference acceleration is a constant that is used as a reference for performing acceleration control of the electric motors 21L and 21R. Similarly, the third reference deceleration is a constant used to perform deceleration control of the electric motors 21L and 21R.

Subsequently, step ST305 selectively reads out or retrieves data about a third reference PID from the memory 63. The third reference PID is a PID constant which is used as a reference for performing PID control of rotating speeds of the electric motors 21L and 21R.

Then, step ST306 detects an opening Sa of the throttle valve 71 by reading an output signal from the throttle position sensor 75.

At the next step ST307, a predetermined speed limit is provided with respect to the rotating speed of the electric motors 21L and 21R. In the third control mode, the rotating speed of the electric motors 21L and 21R is limited so as to reduce the travel speed of the travel units 11L and 11R to about half. This arrangement ensures that the snow removing machine 10 can travel with higher stability to thereby achieve a snow removing operation with higher finishing accuracy as compared to the first and second control mode, as will be discussed later.

Figure 12:
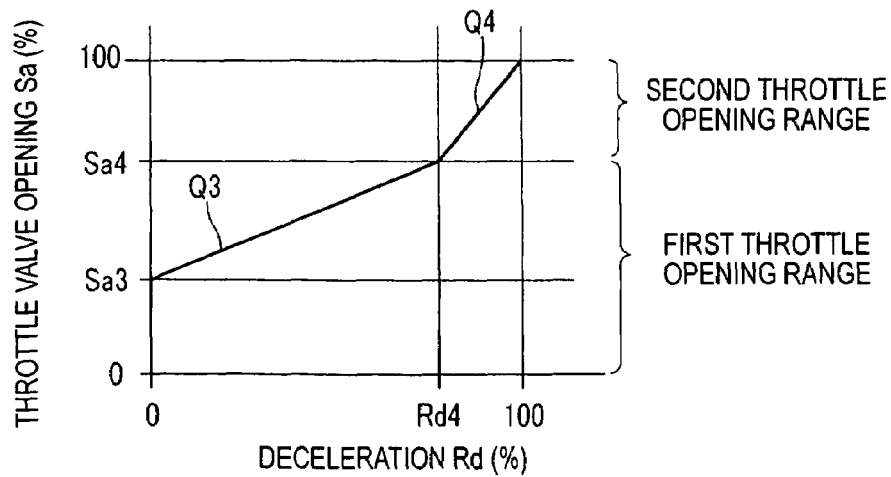
FIG. 12, appearing with FIG. 8, is a view showing a load control map used in the third control mode.

Subsequently, step ST308 selectively reads out or retrieves a third load control map from the memory 63. The third load control map, as shown in FIG. 12, represents a correspondence established between the opening Sa (%) of the throttle valve 71 on the Y-axis and the deceleration Rd (%) of the travel units 11L and 11R on the X-axis. The throttle valve opening Sa has a first range defined between the fully closed position (Sa=0%) and a partly open intermediate position (Sa=Sa4%) located between the fully closed position and the fully open position (Sa=100) of the throttle valve 71, and a second range defined between the partly open intermediate position and the fully open position of the throttle valve 71. The third load control map has performance characteristics represented by a line bent downward at an intermediate position thereof. The performance characteristic line of the third load control map is determined such that the deceleration Rd of rotating speed of the electric motors 21L and 21R (i.e., the deceleration Rd of travel speed of the travel units 11L and 11R), which increases with an increase in the throttle valve opening Sa, is set to be greater in the first-throttle valve opening range than in the second-throttle valve opening range.

Stated more specifically, the deceleration Rd of rotating speed of the electric motors 21L and 21R (i.e., the deceleration of travel speed of the travel units 11L and 11R) is set so that Rd is to be 0% while the throttle valve opening Sa increases from 0% to Sa3%, Rd is to be Rd4% when Sa is Sa4%, and Rd is to be 100% when Sa is 100%, where Sa3 is smaller than Sa4 and Rd4 is smaller than 100%.

In that part of the first throttle-valve opening range extending between Sa3% and Sa4%, the performance characteristic line of the third load control map has a gentler or smaller gradient (as indicated by a first line segment Q3) than as it is in the second throttle-valve opening range extending between Sa4% and 100% (as indicated by a second line segment Q4).

As discussed above, in the first throttle-valve opening range defined between the fully closed position (Sa=0%) and the partly open intermediate position (Sa=Sa4%) of the throttle valve 71, the deceleration Rd of rotating speed of the electric motors 21L and 21R i.e., the deceleration of travel speed of the travel units 11L and 11R) is set to increase with an increase in the throttle valve opening Sa at a first rate. In the second throttle-valve opening range defined between the partly open intermediate position (Sa=Sa4%) and the fully open position (Sa=100%) of the throttle valve 71, the deceleration Rd of rotating speed of the electric motors 21L and 21R (i.e., deceleration of the travel speed of the travel units 11L and 11R) is set to increase with an increase in the throttle valve opening Sa at a second rate which is smaller than the first rate as achieved in the first throttle-valve opening range.

When the actual revolving speed Ne of the engine 14 is caused to decrease due to an increase in the load, the opening Sa of the throttle valve 71 is increased. In this instance, according to the third load control map, the rotating speed of the electric motors 21L and 21R (i.e., the travel speed of the travel units 11L and 11R) slows down acutely as the throttle valve opening Sa increases.

Referring back to FIG. 11, step ST308 is followed by step ST309 where the revolving speed of the engine 14 is controlled according to the target engine revolving speed Es. At the next step ST310, the rotating speeds of the electric motors 21L and 21R are controlled on the basis of the target travel speed Ms, third reference acceleration or deceleration, third reference PID, and third load control map (FIG. 12). The motor rotating speed control is performed in such a manner that when the actual engine revolving speed Ne is caused to decrease due to an increase in the load, the rotating speed of the electric motors 21L and 21R, namely, the travel speed of the travel units 11L and 11R is slowed down or reduced according to the third load control map shown in FIG. 12. After the control of rotating speed of the electric motors 21L and 21R at step ST310, the control returns to step ST05 shown in FIG. 6.

The constants assigned to the respective reference accelerations and decelerations stated in steps ST105, ST205 and ST304 are set as follows. With the second reference acceleration and the second reference deceleration being regarded as standards, the first reference acceleration and the first reference deceleration are set to be greater than the second reference acceleration and the second reference deceleration, respectively, and the third reference acceleration and the third reference deceleration are set to be smaller than the first reference acceleration and the first reference deceleration, respectively. Stated in other words, the constants for the first, second and third reference accelerations and decelerations are set in such a manner that the rotating speed of the electric motors 21L and 21R assumes a high speed in the first control mode, an intermediate speed in the second control mode, and a low speed in the third control mode.

The first, second and third PID constants used respectively in steps ST106, ST206 and ST305 for performing PID (proportional-plus-integral-plus-derivative) control of the travel speed are set in such a manner that response times in the first and second control modes are shortened while the response time in the third control mode is elongated.

Adjustment of the revolving speed Ne of the engine 14 achieved in each control mode is as follows.

In the first control mode, irrespective of the ON/OFF state of the auger switch 45, the revolving speed Ne of the engine 14 can be adjusted by manually operating the throttle lever 52 at the desire of the human operator. It is possible according to the invention to modify the arrangement such that the engine revolving speed Ne can be adjusted only when the auger switch 45 is in the ON state.

In the second control mode, if the auger switch 45 is in the OFF state, the engine revolving speed Ne is kept at a preset given low speed value. Alternatively, when the auger switch 45 is in the ON state, the engine revolving speed Ne can be adjusted by manually operating the throttle lever at the will of the human operator. In this instance, a maximum engine revolving speed can be obtained approximately at a maximum engine output.

In the third control mode, when the auger switch 45 is in the OFF state, the engine revolving speed Ne is kept at the preset given lower speed value. Alternatively, when the auger switch 45 is in the ON state, the engine revolving speed Ne is kept at a preset given high speed value, which substantially corresponds to a maximum torque of the engine 14.

It appears clear from the foregoing description that in view of a correlation established between the snow-removing load and the travel speed, the travel speed of the travel units 11L and 11R is controlled according to the corresponding load control map only when the auger switch 45 is in the ON state.

In the control routines discussed above, the left and right electric motors 21L and 21R may be controlled using pulse-width modulation (PWM) in such a manner that in accordance with control signals supplied from the control unit 61, the motor drivers 84L and 84R produce pulse signals with pulse-width modulation to control rotation of the electric motors 21L and 21R.

As thus far described, the snow removing machine 10 embodying the present invention comprises the engine 14 mounted on the machine body 19 for driving the snow removing unit 13, the left and right electric motors 21L and 21R mounted on the machine body 19 for driving left and right travel units 11L and 11R at variable speeds to thereby enable the machine body 19 and hence the snow removing machine 10 to travel along a ground surface, and the control unit 61 mounted on the machine body 19 for controlling the travel speed of the snow removing machine 10 while keeping the engine 14 and the electric motors 21L and 21R linked in operation with each other. The control unit 61, on the basis of plural load control modes each corresponding to the loads on the snow removing unit 13, controls an output of the engine 14 and the travel speed of the snow removing machine 10. The plural load control modes comprise a first control mode in which control is performed based on the revolving speed Ne of the engine 14 through manual operations by the human operator, a second control mode in which control is performed so that the travel speed of the snow removing machine 10 decreases moderately with respect to an increase in the opening Sa of a throttle valve 71 associated with the engine 14, and a third control mode in which control is performed so that the travel speed of the snow removing machine 10 decreases with an increase in the opening Sa of the throttle valve 71 at a greater extent or degree than as achieved in the second control mode.

The first control mode is a so-called "manual" mode as it performs control of the travel speed based on the revolving speed Ne of the engine 14 through manual operations by the human operator. The revolving speed Ne of the engine 14 tends to decrease as the load on the snow removing unit 13 increases. In this instance, the human operator may recognize an increase in the load on the snow removing unit 13 by sensing a reduction of the engine revolving speed Ne. Upon sensing of the reduction of the engine revolving speed Ne, the human operator manually operates the throttle lever 52 in a direction to increase the opening Sa of the throttle valve 71 to such an extent that the engine revolving speed Ne can be maintained at a desired value. Since the first control mode is arranged to perform load control based on the engine revolving speed Ne, this control mode can be employed in an application where the human operator can recognize a change in the load on the snow removing unit 13. Due to a little intervention by the control unit 60, the first control mode allows the human operator to fully reflect its will or desire in operating or maneuvering the snow removing machine 10.

In view of the foregoing, the first control mode should preferably be selected when the human operator is desirous of operating the snow removing machine at its own discretion. Thus, the first control mode is particularly suitable for operation by skilled human operators.

The second control mode is a so-called "power" or "semi-automatic" mode as it performs control in such a manner that the travel speed decreases moderately with respect to an increase in the opening Sa of the throttle valve 71. When the load on the snow removing unit 13 increases, the revolving speed Ne of the engine 14 tends to slow down or decrease. In this instance, the human operator is allowed to manipulate the throttle lever 52 in a direction to increase the opening Sa of the throttle valve 71 so that the engine revolving speed Ne is kept at a desired value. In the second control mode, intervention by the control unit 61 occurs a little as long as the snow removing unit 13 can be operated by the power of the engine 14.

Furthermore, in the second control mode, the deceleration of travel speed takes place moderately with respect to an increase in the opening Sa of the throttle valve 71. Thus, the second control mode should preferably be selected when the human operator does not wish to cause a noticeable slow-down of the travel speed even, under heavily loaded condition of the snow removing unit 13. The second control mode is particularly suitable for operation by semiskilled human operators or those operators who are desirous of achieving a snow removing operation quickly and efficiently. In the second control mode, the human operator is allowed to shift the throttle lever 71 in a direction to slow down the engine revolving speed Ne, thereby adjusting a snow throwing distance from the shooter 26.

The third control mode is a so-called "auto" mode as it performs control in such a manner that the travel speed decreases with an increase in the opening Sa of the throttle valve 71 to a greater extent or degree than as achieved in the second control mode. In the third control mode, if the load on the snow removing unit 13 increases, the opening Sa of the throttle valve 71 is automatically increased to the extent that the revolving speed Ne of the engine can be maintained at a desired value. In this instance, the travel speed greatly slows down with respect to an increase in the opening Sa of the throttle valve 71. Thus, when the load on the snow removing unit 13 increases, this causes a great reduction in the travel speed of the snow removing machine 10. The third control mode should preferably be selected when the human operator is desirous of suppressing an increase in the load on the snow removing unit 13 while allowing a certain slowdown or reduction of the travel speed. When selected, the third control mode ensures that the human operator can operate the snow removing machine with utmost easy and provide a beautiful finish.

As control modes to be achieved by the control unit 61, the snow removing machine 10 embodying the present invention has three control modes, i.e., a manual first control mode which is particularly suitable for skilled human operators, a semiautomatic second control mode which is particularly suitable for semiskilled human operators, and an automatic third control mode which is particular suitable for unskilled human operators. The snow removing machine 10 having such plural different control mode is highly user-friendly for all individual human operators of different skill levels.

In one preferred form of the invention, the first control mode is set or arranged so that the rate of decrease of the travel speed increases with an decrease in the revolving speed Ne of the engine 14. The second control mode is arranged so that the rate of decrease (i.e., deceleration) of the travel speed, which increases with an increase in the opening Sa of the throttle valve 71, is set to be smaller in a first range of the throttle valve opening Sa than in a second range of the throttle valve opening Sa, wherein the first throttle-valve opening range is defined between a fully closed position (zero-throttle position) and a partly open intermediate position located between the fully closed position and a fully open position (full-throttle position) of the throttle valve 71, and the second throttle-valve opening range is defined between the intermediate throttle position and the full-throttle position of the throttle valve 71. The third control mode is arranged so that the rate of decrease (i.e., deceleration) of the travel speed, which increases with an increase in the opening Sa of the throttle valve 71, is set to be greater in a first throttle-valve opening range defined between the fully closed position and a partly open second intermediate position located between the fully closed position and the fully open position of the throttle valve 71, than in a second throttle-valve opening range defined between the second intermediate position and the fully open position of the throttle valve 71.

The first control mode is a mode that is provided for the purpose of inviting the human operator's attention to the occurrence of undue load. To this end, the first control mode only needs to increase the rate of decrease or deceleration of the travel speed as the revolving speed Ne of the engine 14 decreases. With the first control mode being selected, when the snow removing unit 13 is subjected to undue load, the engine revolving speed Ne is caused to slow down and the travel speed of the snow removing machine 10 tends to decrease with increased deceleration. In this instance, the human operator may recognize the occurrence of the undue load by sensing a decrease in the travel speed of the snow removing machine. As a result, the human operator is able to operate the snow removing machine freely at its own discretion in accordance with changes in the load on the snow removing unit 13.

The second control mode, when selected, allows the human operator to increase the opening Sa of the throttle valve 71 to near a performance limit of the engine 14 so that the snow removing unit 13 continues operating under heavy load condition without causing noticeable reduction in the travel speed of the snow removing machine 10 (i.e., while keeping the travel speed of the snow removing machine 10 at a substantially constant value). As a consequence, the snow removing operation is carried out speedily and efficiently.

In the second control mode, as understood from the second load control map shown in FIG. 10, while the opening Sa of the throttle valve 71 increases from 0% to Sa2% which is near the full-throttle position, the deceleration of the travel speed increases a little, i.e., from 0% to Rd2%. In other words, in the first throttle-valve opening range defined between the fully closed position (Ss=0%) and the partly open intermediate position (Sa=Sa2%) of the throttle valve 71, the rate of decrease (i.e., deceleration) Rd of the travel speed is set to increase with an increase in the opening Sa of the throttle valve 71 at a first rate. In the second throttle-valve opening range defined between the partly open intermediate position (Sa=Sa2%) and the fully open position (Sa=100%) of the throttle valve 71, the rate of decrease (i.e., deceleration) Rd of the travel speed is set to increase with an increase in the opening Sa of the throttle valve 71 at a second rate, which is larger than the first rate as achieved in the first throttle-valve opening range.

In the snow removing machine 10, the rotating speeds of the auger 27 and the blower 28 increase with the revolving speed of the engine 14. Accordingly, the ability of the auger 27 to collect snow and the ability of the blower 28 to throw the collected snow through the shooter 29 to a distant place, which represent the performances of the snow removing unit 13, increase as the engine revolving speed increases. In order to increase the engine revolving speed, the throttle valve opening Sa should be increased. However, since the deceleration Rd of the travel speed, which increases with an increase in the throttle valve opening Sa, is set to be relatively small, the travel speed of the snow removing machine 10 does not slow down very much even though the load on the engine 14 increases.

Thus, in the second control mode, it is possible to increase the opening Sa of the throttle valve 71 to near a performance limit of the engine 14, so that the snow removing unit 13 can continue operating under heavy load condition while keeping the travel speed of the snow removing machine 10 at a substantially constant value. The snow removing machine 10 can therefore achieve a snow removing operation speedily and efficiently.

When the third control mode is selected, a slight increase in the throttle valve opening Sa causes a great decrease in the travel speed of the snow removing machine 10. By thus slowing down the travel speed of the snow removing machine 10, it is possible to lessen the load on the snow removing unit 13, thereby reducing the engine load.

In the third control mode, as understood from the third load control map shown in FIG. 12, while the opening Sa of the throttle valve 71 varies from the fully closed position (Sa=0%) to the partly open intermediate position (Sa=Sa4%), the deceleration Rd of the travel speed increases from 0% to Rd4%, which is close to 100%. In other words, in the first throttle-valve opening range defined between the fully closed position (Ss=0%) and the partly open intermediate position (Sa=Sa4%) of the throttle valve 71, the rate of decrease (i.e., deceleration) Rd of the travel speed is set to increase with an increase in the opening Sa of the throttle valve 71 at a first rate. In the second throttle-valve opening range defined between the partly open intermediate position (Sa=Sa4%) and the fully open position (Sa=100%) of the throttle valve 71, the rate of decrease (i.e., deceleration) Rd of the travel speed is set to increase with an increase in the opening Sa of the throttle valve 71 at a second rate, which is small as compared to the first rate as achieved in the first throttle-valve opening range. When Sa=100%, RD=100%, this means that the snow removing vehicle 10 stops to travel along a ground surface.

In the snow removing machine 10, the amount of snow to be removed, i.e., the load on the snow removing unit 13 increases as the travel speed of the snow removing machine 10 increases. To ensure that the snow removing operation is carried out in a stably manner, it is preferable that (a) the opening Sa of the throttle valve 71 be increased to maintain the desired revolving speed Ne of the engine 14, or (2) the travel speed of the snow removing machine 10 be lowered to reduce the load on the snow removing unit 13.

The third control mode is particularly useful for such application because when the load on the snow removing unit 13 increases, the opening Sa of the throttle valve 71 is increased and, at the same time, the travel speed of the snow removing machine 10 decreases greatly as compared to the rate of increase in the opening Sa of the throttle valve 71. By thus slowing down the travel speed of the snow removing machine 10, it is possible to suppress undue increase in the load on the snow removing unit 13 and achieve a snow removing operation stably with improved finishing quality. Furthermore, since the engine 14 is not subjected to undue load, the snow removing machine 10 is good fuel economy.

By thus providing three different control modes that can be selected depending on the skill levels of individual human operators, the snow removing machine 10 is extremely easy-to-use for all of the human operators including unskilled, semiskilled and skilled operators. The first, second and third control modes can be readily selected by turning the knob 51a of the mode selector switch 51 to a desired position.

Figure 13A:
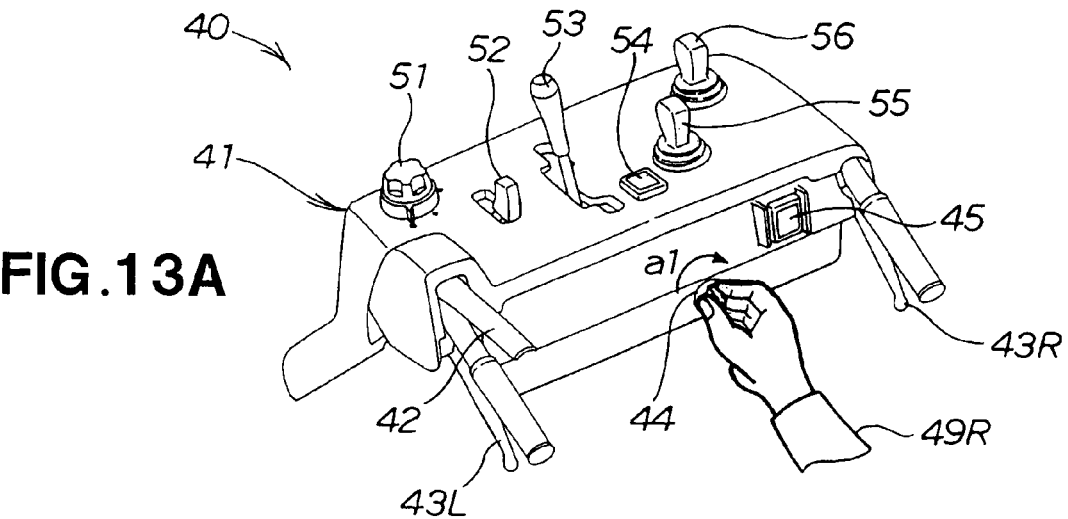
FIGS. 13A to 13C are perspective views showing a sequence of operations to be achieved by a human operator to place the snow removing machine in a ready-to-travel condition.
Figure 13B:
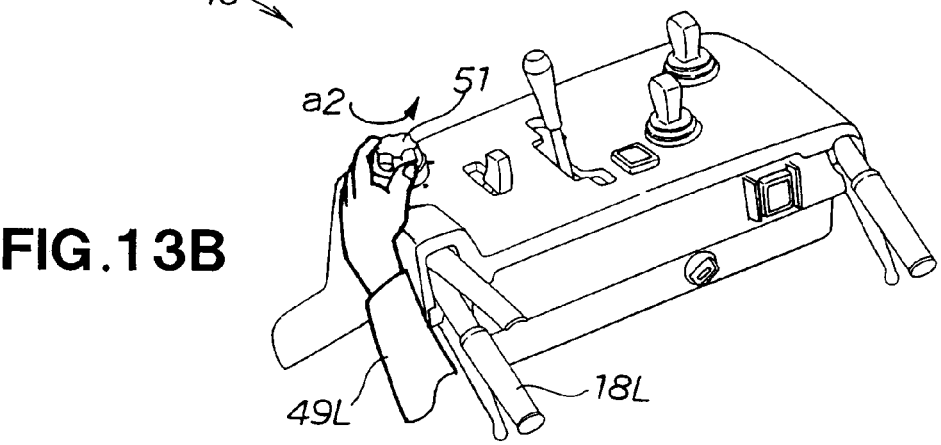
Figure 13C:
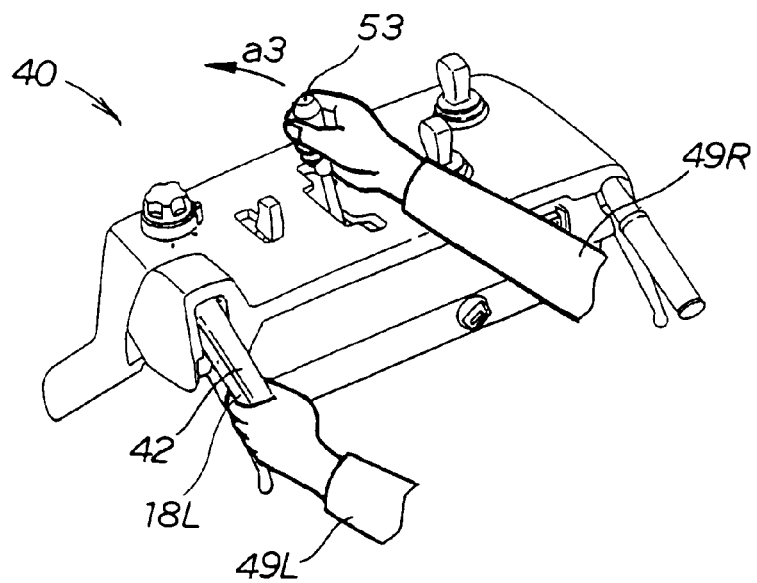

Now, a description will be given about a way of operating the snow removing machine with reference to FIGS. 13 to 16. As shown in FIG. 13A, the human operator turns, with its right hand 49R, the main switch 44 clockwise from the OFF position to the ON position as indicated by the arrow "a1" to thereby start the engine 14. Then, using its left hand 49L, the human operator turns the knob 51a of the mode selector switch 51 counterclockwise as indicated by the arrow "a2", thus setting a desired control mode for the snow removing operation. In the illustrated embodiment, the third control position (AUTO position) P3 (FIG. 3) is selected. Subsequently, as shown in FIG. 13C, the human operator grips with its left hand 49L the travel ready lever 42 together with the left handgrip 18L and, while keeping a grip on the travel ready lever 42, the human operator shifts the direction-speed control lever 53 from the neutral position to a forward travel range (forward position) as indicated by the arrow "a3". The snow removing machine 10 now starts to travel in a forward direction.

Figure 14A:
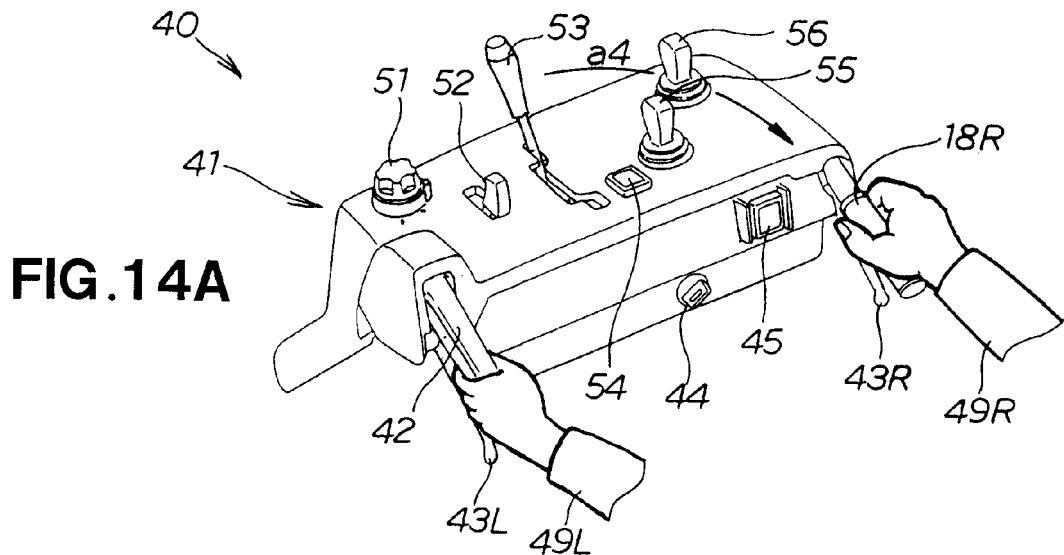
FIGS. 14A to 14C are perspective views showing a sequence of operations to be achieved by the human operator to cause the snow removing machine to start a snow removing operation.
Figure 14B:
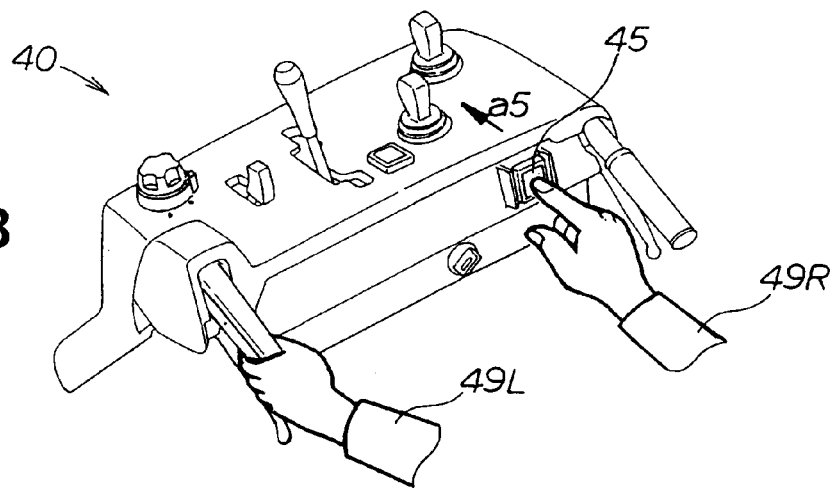
Figure 14C:
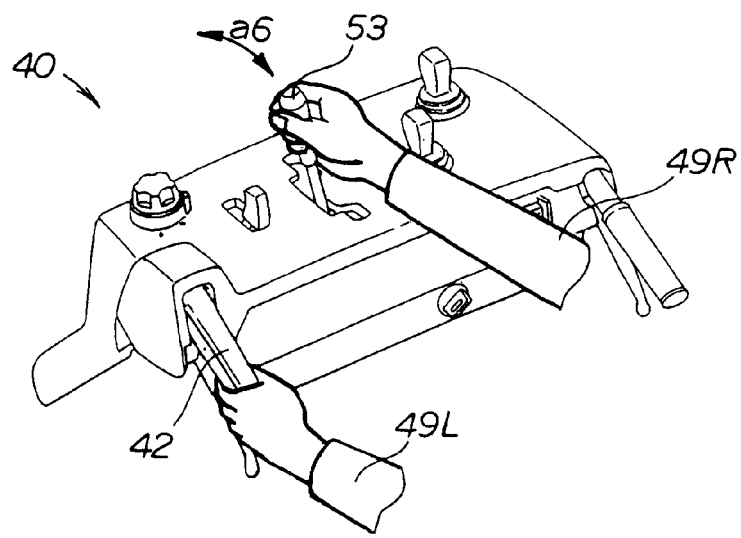

As shown in FIG. 14A, the human operator then releases the direction-speed control lever 53 and grips the right handgrip 18R with its right hand 49R as indicated by the arrow "a4". The snow removing machine 10 continues its traveling in the forward direction. Subsequently, the human operator depresses the auger switch 45 as indicated by the arrow "a5" shown in FIG. 14B whereupon the auger 27 (FIG. 1) is driven to rotate by power from the engine 14 that is transmitted via the electromagnetic clutch 31. The snow removing machine 10 is now in a position ready to start a snow removing operation. In this instance, if the mode selector switch 51 has been set in the first control position (MANUAL position) P1, the human operator needs to shift the direction-speed control lever 53 fore and aft with its right hand 49R, as indicated by the arrow "a6" shown in FIG. 14C, to thereby adjust the forward travel speed of the snow removing machine 10. Throughout the operations shown in FIGS. 14A to 14C, the travel ready lever 42 is continuously kept in a gripped state by the human operator.

Figure 15A:
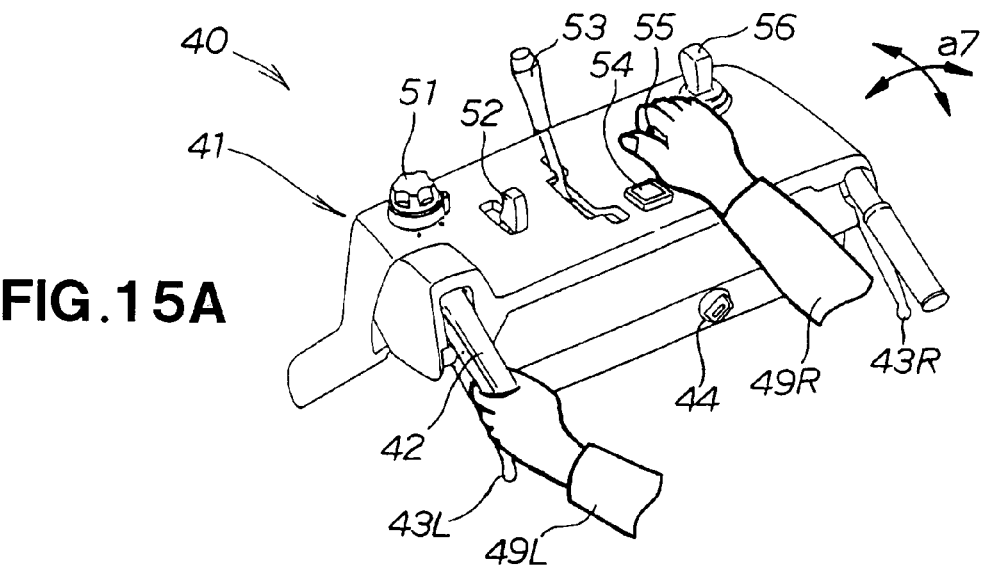
FIGS. 15A to 15C are perspective views showing various operations performed by the human operator to control the posture of the snow removing unit including a shooter.
Figure 15B:
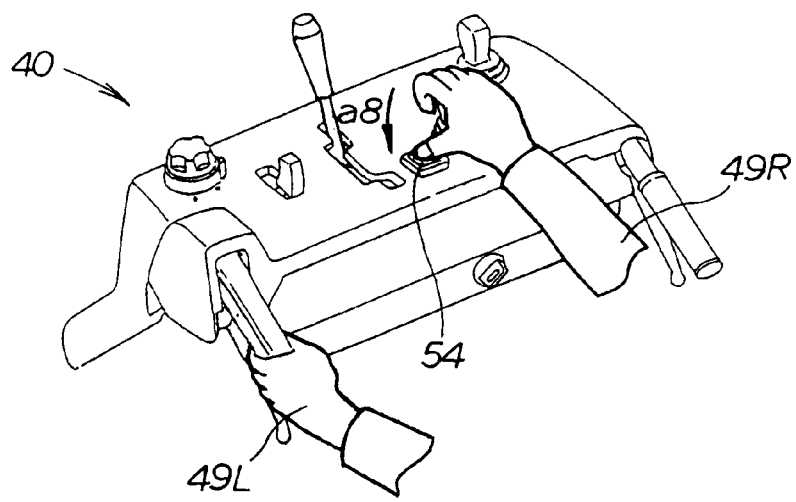
Figure 15C:
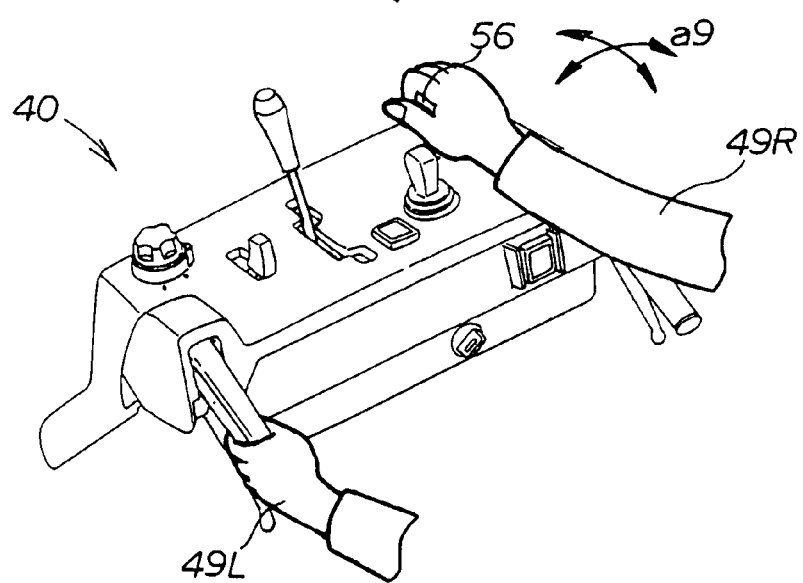

During the snow removing operation, the human operator may actuate or shift the auger housing posture control lever 55 fore and aft and left and right with its right hand 49R, as indicated by the arrows "a7" shown in FIG. 15A, so that the height and roll of the auger 27 (FIG. 2) can be adjusted appropriately in view of the nature of piled snow to be removed. When the auger 27 is to be returned to its original position, the human operator depresses the reset switch 54 with its right thumb, as indicated by the arrow "a8" shown in FIG. 15B whereupon the auger 27 resumes its original posture by action of the pivot drive mechanism 16 (FIG. 2) and the roll drive mechanism 38 (FIG. 2). Furthermore, the human operator may actuate or shift the shooter operating lever 56 fore and aft and left and right with its right hand, as indicated by the arrows "a9" shown in FIG. 15C, so that the shooter 29 (FIG. 1) can assume a desired orientation necessary to throw out the removed snow to a desired location. During that time, the travel ready lever 42 is continuously gripped with the left hand 49 of the human operator, as shown in FIGS. 15A to 15C.

Since the mode selector switch 51 has been set to the third control position (AUTO position) P3 as described above with reference to FIG. 13B, the human operator does not need to actuate the throttle lever 52. On the other hand, if the first control position (MANUAL position) P1 has been selected by the mode selector switch 51, the human operator needs to actuate the throttle lever 52 with its right hand 49R, as indicated by the arrow "a10" shown in FIG. 16A, so as to adjust the revolving speed of the engine (FIG. 1) in accordance with the conditions of snow to be removed. Alternatively, if the second control position (POWER position) P2 has been selected by the mode selector switch 51, the snow throwing distance from the shooter 29 can be adjusted by shifting the throttle lever 52 in an appropriate manner.

Figure 16A:
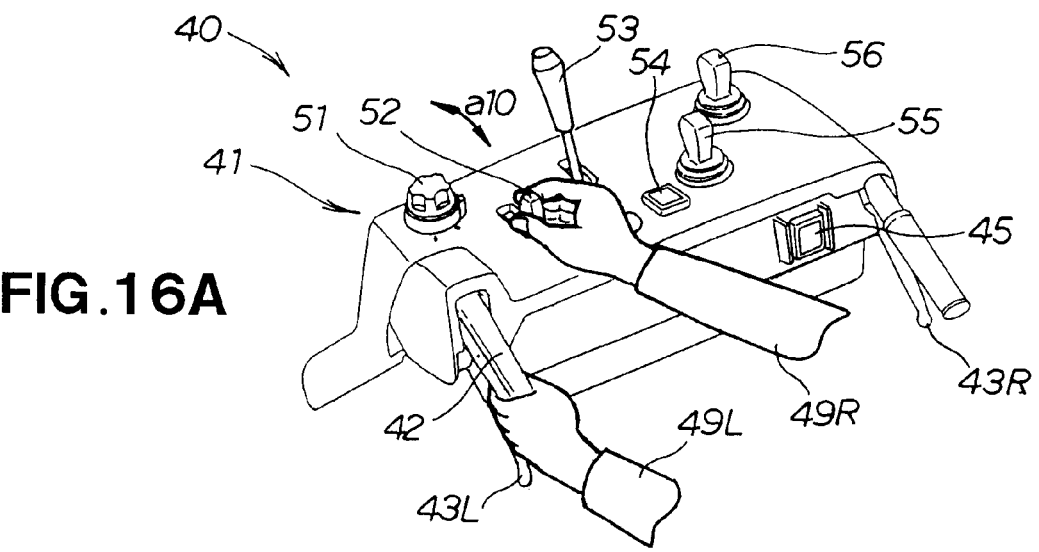
FIGS. 16A to 16C are perspective views showing various operations performed by the human operator to change the engine revolving speed and the direction of travel of the snow removing machine.
Figure 16B:
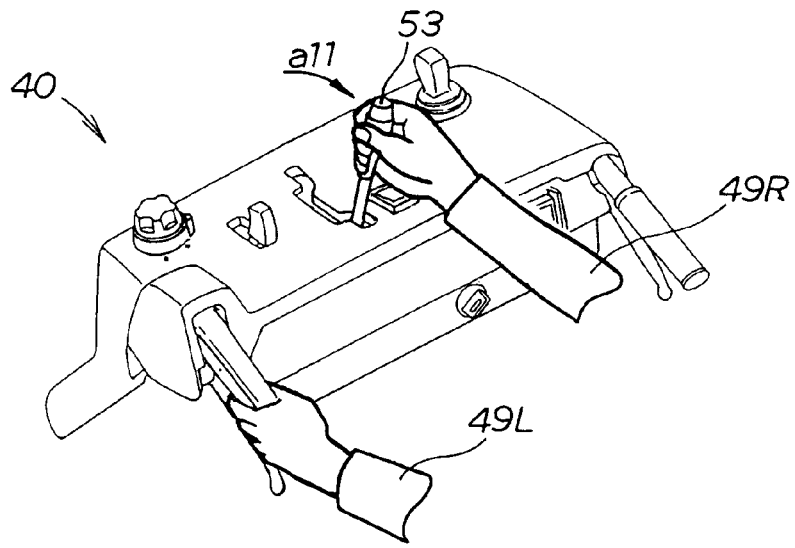
Figure 16C:
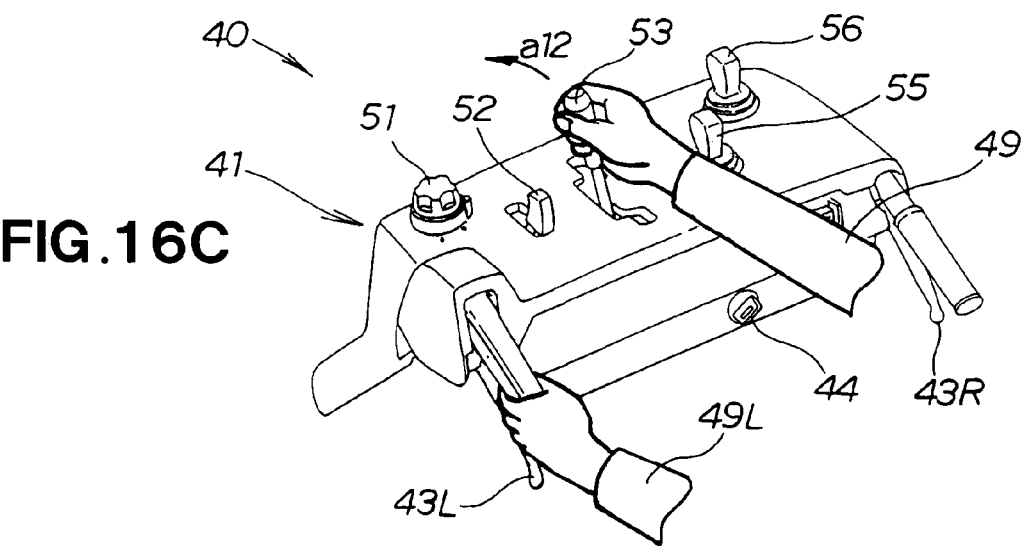

When the human operator shifts the direction-speed control lever 52 through the neutral range into the reverse travel range (reverse position) using its right hand 49R, as indicated by the arrow "a11" shown in FIG. 16B, the snow removing machine 10 starts traveling in a reverse or backward direction. Thus, the human operator can interrupt the snow removing operation. If the human operator is desirous to restart the snow removing operation, he or she will shift the direction-speed control lever 53 from the reverse range through the neutral range into the forward range using its right hand 49R, as indicated by the arrow "a12" shown in FIG. 16C. During the operations shown in FIGS. 16A to 16C, the travel ready lever 42 is continuously gripped by the left hand 49L of the human operator.

The human operator needs to operate the mode selector switch 51 only one time before a snow removing operation is started. The travel ready lever 42 should be kept gripped by the human operator during the snow removing operation.

As described above, the snow removing machine 10 according to the present invention includes a mode selector switch 51 disposed on the operating section 40 for operation by the human operator to select one snow removing operation mode from among plural alternative snow removing operation modes that are set in advance in the control unit 61 on the basis of a travel speed of the machine body, a revolving speed of the engine and a throttle opening of the engine taken in combination. The snow removing machine 10 having such mode selector switch 51 is user-friendly because the human operator can choose one operation mode that is best suited for its skill level in terms of in the snow removing operation.

The mode selector switch 51 is generally operated at one time before a snow removing operation is started, whereas the travel ready switch is continuously gripped by the human operator during the snow removing operation. Furthermore, during the snow removing operation, the auger housing posture control lever (snow removing unit posture control member) 55 is actuated frequently with one hand of the human operator while the travel ready lever 42 is kept gripped by the other hand of the human operator. It is therefore preferable that the mode selector switch 51 is located forwardly of the travel ready lever 42 so that the mode selector switch 51 and the auger housing posture control lever 55 do not interfere with each other. This will increase the efficiency of the snow removing operation.

Additionally, since the throttle lever (adjusting member) 52 is located near the mode selector switch 51, this arrangement allows the human operator to adjust the position of the throttle valve 52 for achieving adjustment of the engine power when the MANUAL position P1 has been selected by the mode selector switch 51, and adjust the position of the throttle lever 52 for achieving adjustment of the snow throwing distance from the shooter 29 when the POWER position P2 has been selected by the mode selector switch 51. With this close arrangement of the throttle lever 52 and the mode selector switch 51, the snow removing machine 10 is able to provide a higher degree of manipulation performance.

The mode selector switch 51 preferably comprises a multiposition rotary switch, and the throttle lever 52 is preferably arranged to shift fore and aft and disposed between the mode selector switch 51 and the travel ready lever 42. With this arrangement, it is possible to control the MANUAL and POWER positions P1 and P2 of the mode selector switch 51 and the engine power and the snow-throwing-distance (that are variable with the position of the throttle lever 52) in interlocked relation to one another. This will add to the efficiency of the snow removing operation.

Figure 17:
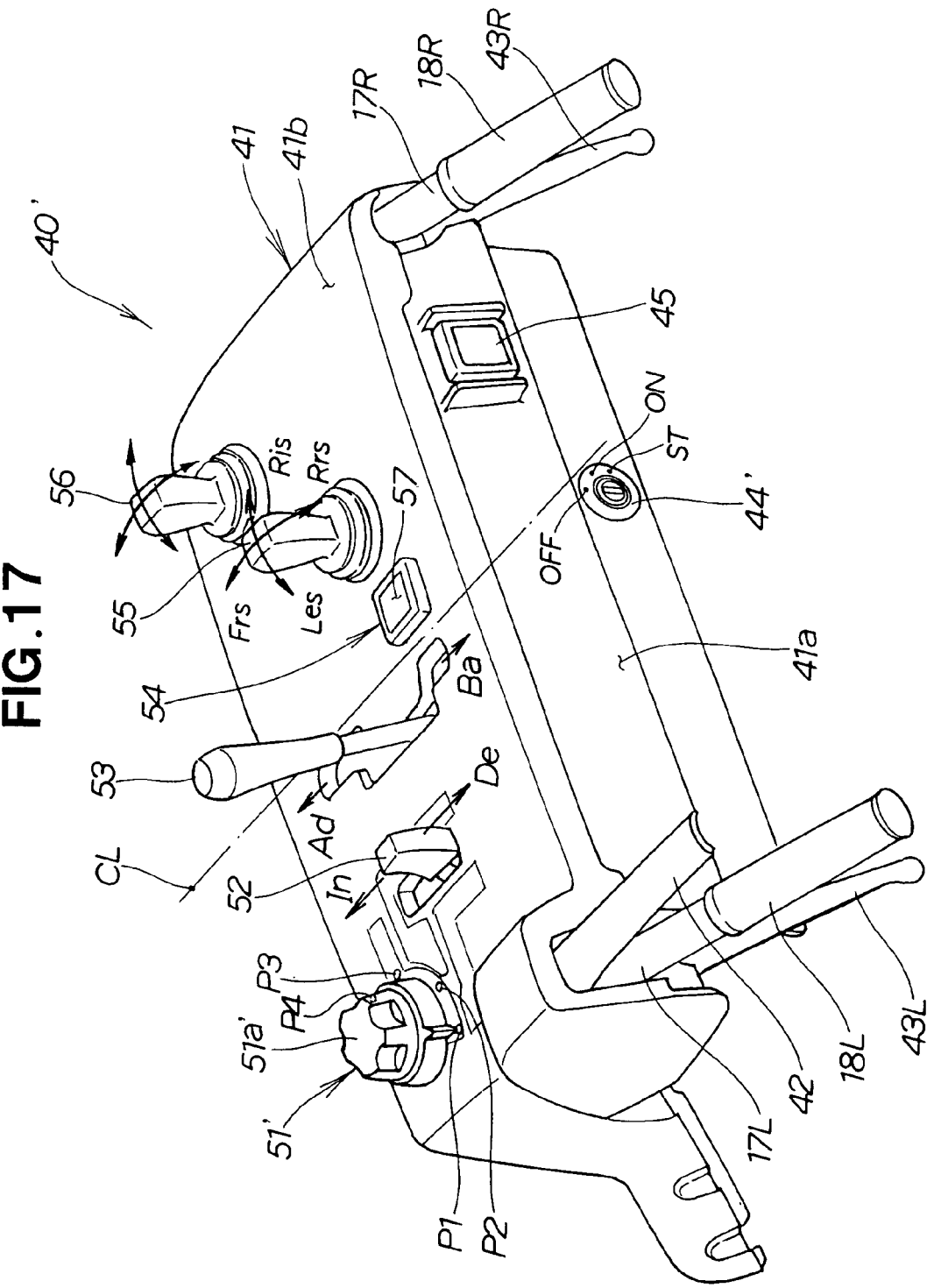
FIG. 17 is a view similar to FIG. 3, but showing an operating section according to a modification of the present invention.
Figure 18:
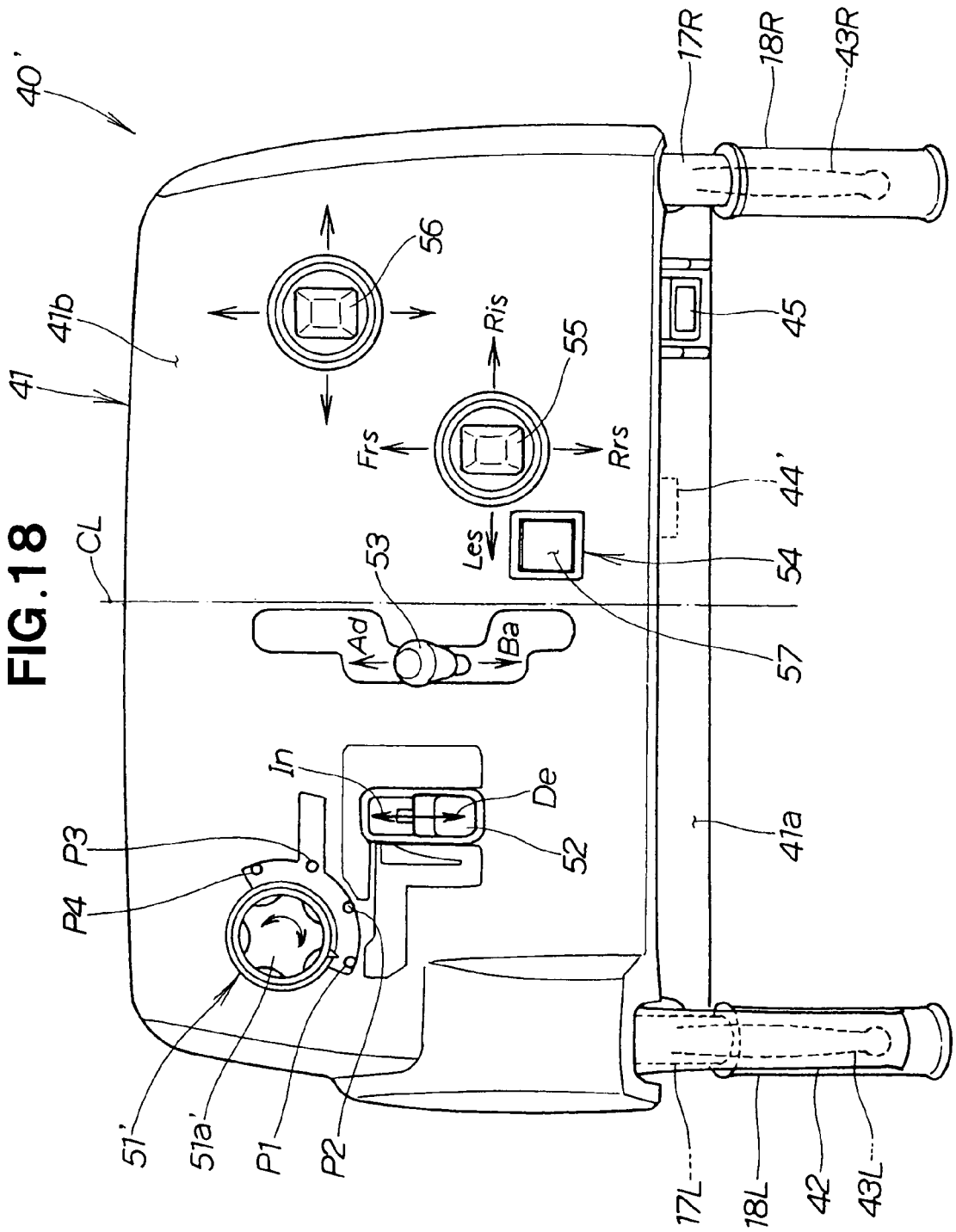
FIG. 18 is a plan view of the modified operating section.

FIGS. 17 and 18 show an operating section 40' according to a modification of the present invention. The modified operating section 40' is differs from the operating section 40 shown in FIGS. 3 and 4 only in the structure and function of a main switch 44' and a mode selector switch 51'.

As shown in FIG. 17, the main switch 44' is a conventional ignition switch which is activated to start the engine 14 when a main key inserted in a keyhole (not designated) in the switch 44' is turned by the human operator. The main switch 44' has three switching positions, namely, an OFF position, an ON position and a ST (start) position that are arranged sequentially in a clockwise direction around the keyhole in the order named. Setting the main key in the OFF position can not only deactivate the engine 14 but also turn off all electric systems of the snow removing machine 10. Shifting the main key from the OFF position to the ON position can activate all the electric systems in the snow removing machine 10 while keeping the engine 14 in a deactivated or stopped state. Setting the main key to the ST (start) position can activate or start the engine 14. Further, shifting the main key from the ST (start) position to the ON position can cause the activated engine 14 to change over directly to its full-scale operation.

When the main key is being set in the ON position, an electric system for supply electric power from the battery 62 (FIG. 2) to the electric motors 21L and 21R is in an activated state so that even when the engine 14 is in the deactivated state, the snow removing machine 10 can perform a battery-mode-traveling operation in which the electric motors 21L and 21R are driven only by electric power supplied from the battery 62.

The mode selector switch 51' is a manually operable multiposition switch arranged to select alternative travel control modes (snow removing operation modes) to be set in the control unit 61 (FIG. 2). In the illustrated embodiment, the mode selector switch 51 comprises a rotary switch having a knob 51a' manually operable to undergo angular movement about its own axis between a first control position P1, a second control position P2, a third control position P3, and a fourth control position P4 that are arranged sequentially abut an axis of rotation of the knob 51a' in the order named. The mode selector switch 51 has four switching positions corresponding respectively to the first, second, third and fourth control positions P1, P2, P3 and P4 of the knob 51a. At the respective switching positions, the mode selector switch 51 generates different switch signals.

When the mode selector switch 51' is switched to assume the first control position P1, it sends a switch signal to the control unit 61, instructing the latter to perform control operation in a first control mode. Similarly, when switched to assume the second control position P2, the mode selector switch 51' sends a switch signal to the control unit 61, instructing the latter to perform control operation in a second control mode. When the mode selector switch 51' is switched to assume the third control position P3, it sends a switch signal to the control unit 61, instructing the latter to perform control operation in a third control mode. When switched to assume the second control position P4, the mode selector switch 51' sends a switch signal to the control unit 61, instructing the latter to perform control operation in a fourth control mode.

Figure 19:
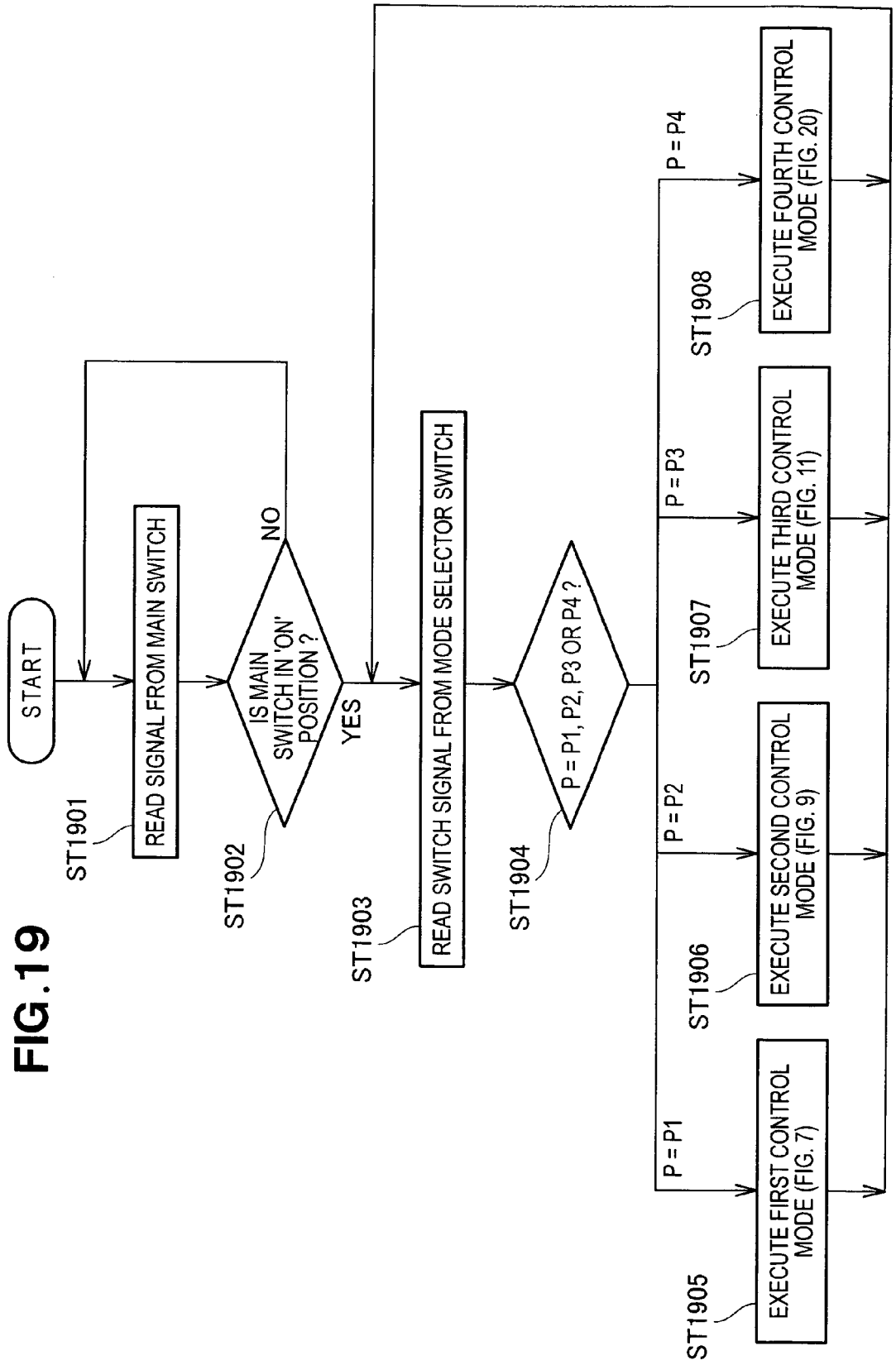
FIG. 19 is a flowchart showing a main control routine executed in the control unit based on a switch signal from a mode selector switch disposed on the operating section shown in FIG. 17.
Figure 20:
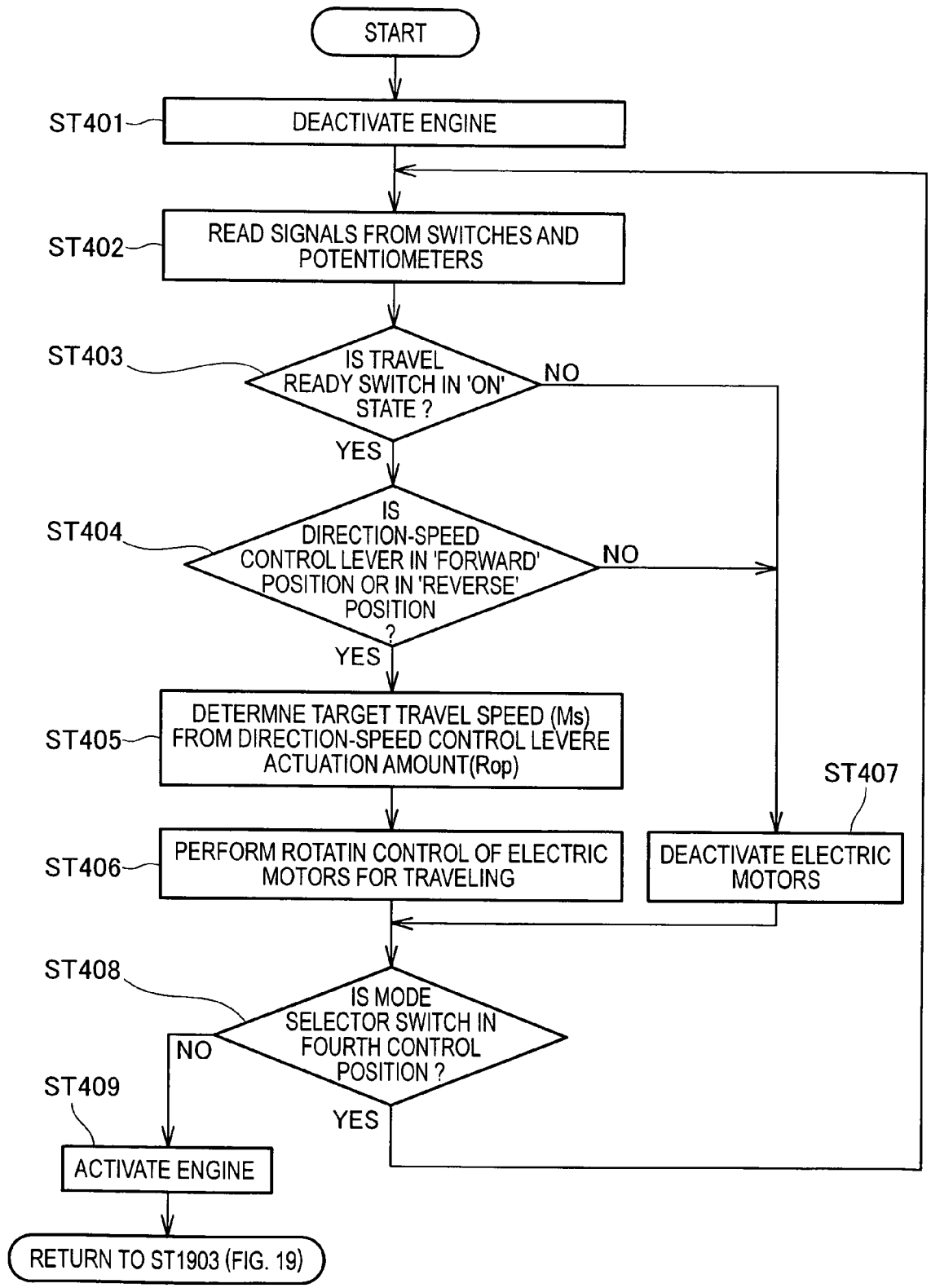
FIG. 20 is a flowchart showing a subroutine executed to achieve a fourth control mode shown in FIG. 19.

Referring now to FIGS. 19 and 20, a description will be given about another embodiment of control performed by the control unit 61 based on instructions from the modified operating section 51 (FIG. 17) under the condition that the direction-speed control lever 53 is in the "FORWARD" range (see FIG. 5) and the auger switch 45 is in the ON state for the purpose of achieving a snow removing operation with the snow removing unit 13 while the snow removing machine 10 is traveling in the forward direction.

FIG. 19 is a flowchart showing a main routine performed by the control unit 61 to control operations of the engine 14 and the electric motors 21L and 21R of the snow removing machine 10.

Step ST1901 of FIG. 19 reads a switch signal from the main switch 44' (FIGS. 17 and 18). Then, step ST1902 determines whether the main switch 44' is in the ON position or not. If the determination at step ST1902 is affirmative (YES), the control advances to step ST1903. Alternatively, if the determination at step ST1902 is negative (NO), the control returns to step ST1901.

Step ST1903 reads a switch signal from the mode selector switch 51' (FIGS. 17 and 18). Then, step ST1904 determines a current position P of the mode selector switch 51'. If the current position P is the first control position P1, the control goes on to step ST1905. If the current position P is the second control position P2, the control advances to step ST1906. If the current position P is the third control position P3, the control goes on to step ST1907. Alternatively, if the current position P2 is the fourth control position P4, the control advances to step ST1908.

Step S1905 executes the first control mode for the purpose of controlling the engine 14 and the electric motors 21L and 21R. After execution of the first control mode, the control returns to step ST1903. The first control mode is executed in the same manner as described above with reference to FIGS. 7 and 8 and further description thereof can be omitted.

Step ST1906 executes the second control mode for the purpose of controlling the engine 14 and the electric motors 21L and 21R. After execution of the second control mode, the control returns to step ST01903. The second control is executed in the same manner as described above with reference to FIGS. 9 and 10 and further description thereof can be omitted.

Step ST1907 executes the third control mode for the purpose of controlling the engine 14 and the electric motors 21L and 21R. After execution, the control returns to step ST1903. The third control mode is executed in the same manner as described above with reference to FIGS. 11 and 12 and further description can be omitted.

Step ST1908 executes the fourth control mode in which control is performed so that the electric motors 21L and 21R (FIG. 2) is operated only by electric power supplied from the battery 62 while the engine 14 is in the deactivated state. After execution of the fourth control mode, the control returns to step ST1903. The way of executing the fourth control mode will be described below in greater detail with reference to FIG. 20.

FIG. 20 is a flowchart showing a subroutine to be performed by the control unit 61 for executing the fourth control mode (step ST1908 of FIG. 19).

Step ST401 of FIG. 20 deactivates the engine 14 or keeps a deactivated state of the engine 14. Then, step ST402 reads signals from the respective switches, which include a switch signal from the travel ready switch 42a (FIG. 2) associated with the travel ready lever 42 and a switch signal from the mode selector switch 51', and an output voltage signal from the potentiometer 53a indicative of an actuating direction of the direction-speed control lever 53 as well as an actuating amount (Rop) of the direction-speed control lever 53. The direction-speed control lever actuating direction and amount are determined by a current position of the direction-speed control lever 53 and they are supplied to the control unit 61 as target travel speed instructions for the electric motors 21L and 21R.

Subsequently, step ST403 determines whether or not the travel ready switch 42a is in an ON state (i.e., whether or not the travel ready lever 42 is kept gripped with the human operator). If the determination at ST403 is affirmative (YES), the control advances to step ST404. Alternatively, if the determination at ST403 is negative (NO), the control jumps to step ST07.

Step ST404 determines whether or not the direction-speed control lever 53 is in the "FORWARD" travel range and in the "REVERSE" travel range. If the determination is affirmative (YES), the control advances to step ST405. Alternatively, if the determination is negative (NO), the control is branched to step ST407.

Step ST405 determines a target travel speed Ms of the electric motors 21L and 21R based on the actuation amount Pop of the direction-speed control lever 53. Subsequently, step ST406 performs rotation speed control of the electric motors 21L and 21R on the basis of the target travel speed Ms and, thereafter, the control advances to step ST408.

Step 407 deactivate the electric motors 21L and 21R, and the control then goes on to step ST408. Step 408 determines whether or not the mode selector switch 51' is in the fourth control position P4. If the determination is affirmative (YES), the control returns to step ST402. Alternatively, if the determination is negative (NO), the control is branched to step ST409 where the engine 14 is activated or started to run. Thereafter, the control returns to step ST1903 of FIG. 19.

In the fourth control mode, control is performed so that the electric motors 21L and 21R are operated only by electric power supplied from the battery 62 while the engine 14 is in the deactivated state. The snow removing machine 10 is therefore able to travel over a relatively short distance to thereby perform a battery-mode traveling operation. Since the battery-mode traveling operation is achieved while the engine 14 remains in the deactivated state, it is possible to cut down the fuel cost of the engine 14, increase the service life of the engine 14, and reduce the operation sound level of the snow removing machine 10.

The control unit 61 has a function to deactivate the engine 14 or keep the deactivated state of the engine 14 (ST401 of FIG. 20) only if the main switch 44' has been shifted to the ON position (ST1902 of FIG. 19) and the operation mode has been shifted to the fourth control mode through manual operation of the mode selector switch 51' by the human operator (ST1904 of FIG. 19).

With this arrangement, since the engine 14 is automatically stopped by merely shifting the mode selector switch 51' to the fourth control position P4 for selecting the fourth control mode with the main switch 44' kept in the ON position, the human operator does not need to perform a separate operation to deactivate the engine 14. This improves the usability of the snow removing machine 10.

In one mode of operation, the snow removing machine 10 performs a snow removing operation with the snow removing unit 13 driven by the engine 14 while the travel units 11L and 11R are driven to move the snow removing machine 10 in a desired direction, and after that, the mode selector switch 51' is shifted to the fourth control position P4 whereupon the engine 14 is automatically stopped. The snow removing machine 10 can further continue traveling in the same desired direction until it arrives at a desired position.

The control unit 61 further has a function to automatically activate the engine 14 (ST409 of FIG. 20) when the operation mode is shifted from the fourth control mode to another control mode by means of the mode selector switch 51' (ST408 of FIG. 20). With this automatic activation of the engine 14, the human operator does not need to perform a separate operation to activate the engine 14. The snow removing machine 10 is highly easy to use.

Figure 21:
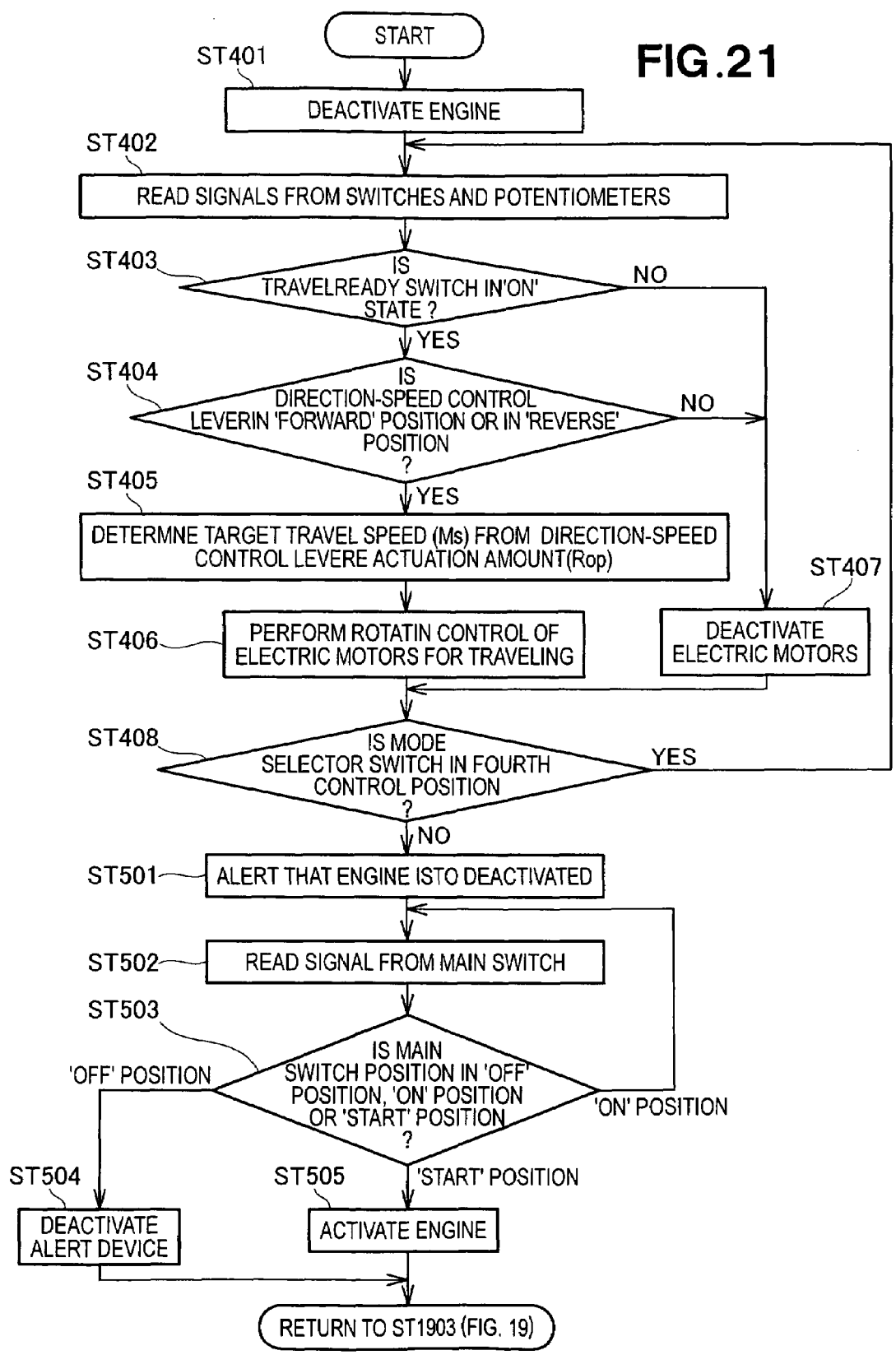
FIG. 21 is a flowchart showing a modified subroutine executed to achieve the fourth control mode shown in FIG. 19.

Referring now to FIG. 21, a description will be given about a modified form of the fourth control mode according to the present invention. FIG. 21 is a flowchart showing a subroutine to be achieved in the control unit 61 to execute the modified fourth control mode. In FIG. 21, steps ST401 to ST408 are identical to those shown in FIG. 20 and no further description thereof is needed. The modified fourth control mode shown in FIG. 21 differs from the fourth control mode of FIG. 20 only in that steps ST501 to ST505 are executed in place of the engine activating step ST409 of FIG. 20.

Figure 22:
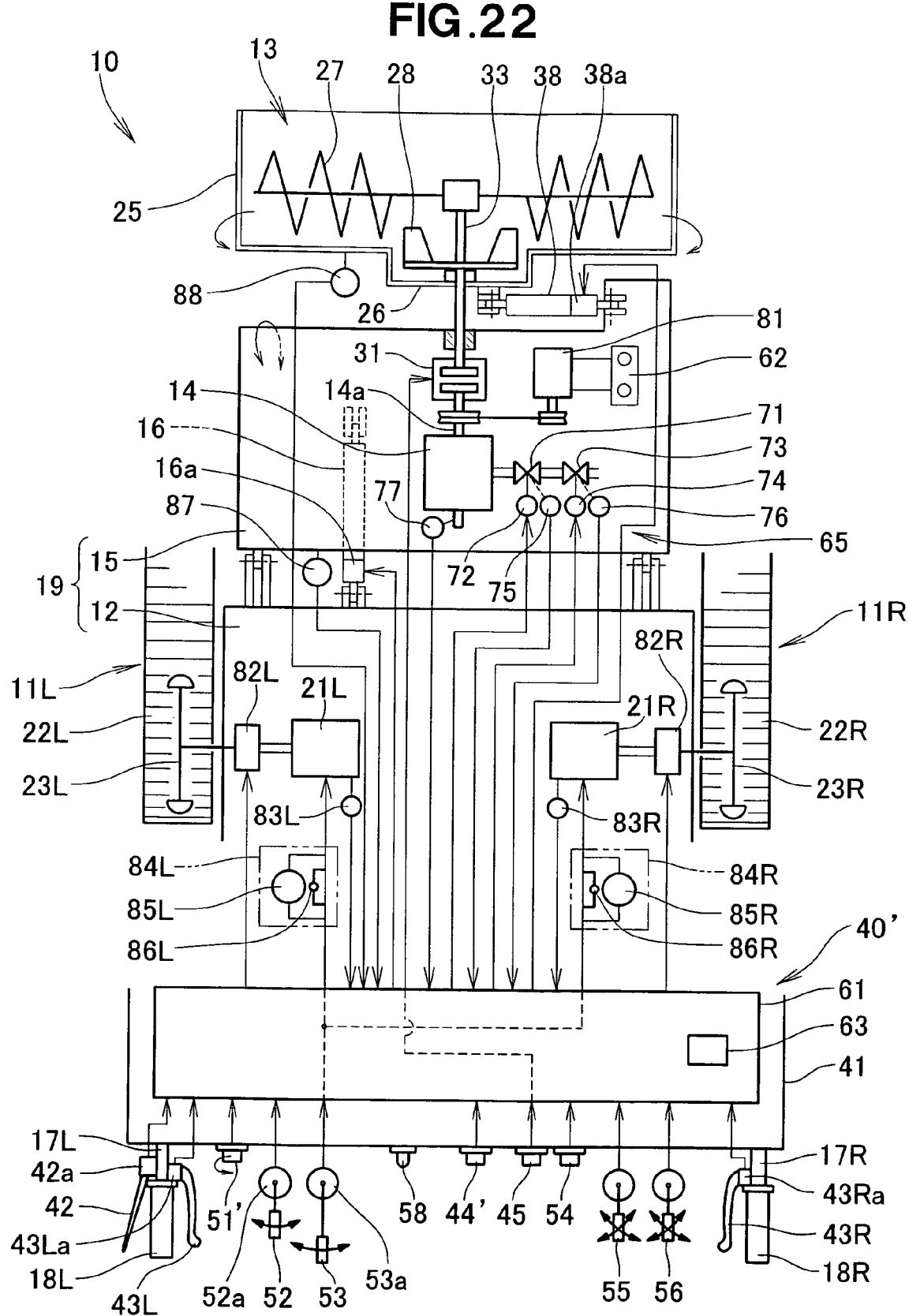
FIG. 22 is a view similar to FIG. 2, but showing a modified form of the control system.

If the determination at step ST408 is affirmative (YES), the control returns to step ST402. Alternatively, if the determination at ST408 is negative (NO), the control is branched to step ST501 where the control unit 61 supplies an alert signal to an alert device 58 (FIG. 22), which alerts the human operator that the engine 14 is to be activated. The alert device 58 may comprise an indicator lamp, an alert sound generator or the like, which is disposed on the operating section 40' as shown in FIG. 22.

Subsequently, step ST502 reads a switch signal from the main switch 44', and at the next step ST503 it is determined whether the main switch 44' is in the OFF position, ON position, or ST (start) position. If the main switch 44' is in the OFF position, the control goes on to step ST504. If the main switch 44' is in the ON position, the control returns to step ST502. Alternatively, if the main switch 44' is in the ST (start) position, the control advances to step ST505.

Step ST504 deactivates the alert device 58 and after that the control returns to ST1903 of FIG. 19.

Step ST505 activates the engine 14 based on the switching signal from the main switch 44' being disposed in the ST (start) position. Subsequently, the control returns to ST1903 of FIG. 19. After a stable rotation of the engine 14 is achieved, the main switch 44' may be shifted from the ST (start) position to the ON position.

In the modified fourth control mode just described above, the control unit 61 has a function to activate the engine 14 (ST505 of FIG. 21) only if the operation mode has been shifted from the fourth control mode to another control mode (ST408 of FIG. 21) by means of the mode selector switch 51' and the main switch 44' has been shifted to the ST (start) position (ST503 of FIG. 21), instructing the control unit 61 to activate the engine 14.

With this arrangement, since shifting of the main switch 44' to the ST (start) position does not bring about actual activation of the engine 14 unless the mode selector switch 51' has been shifted from the fourth control position to another control position, the human operator is able to acknowledge with certainty a mode change from the fourth control mode to another control mode.

Figure 23:
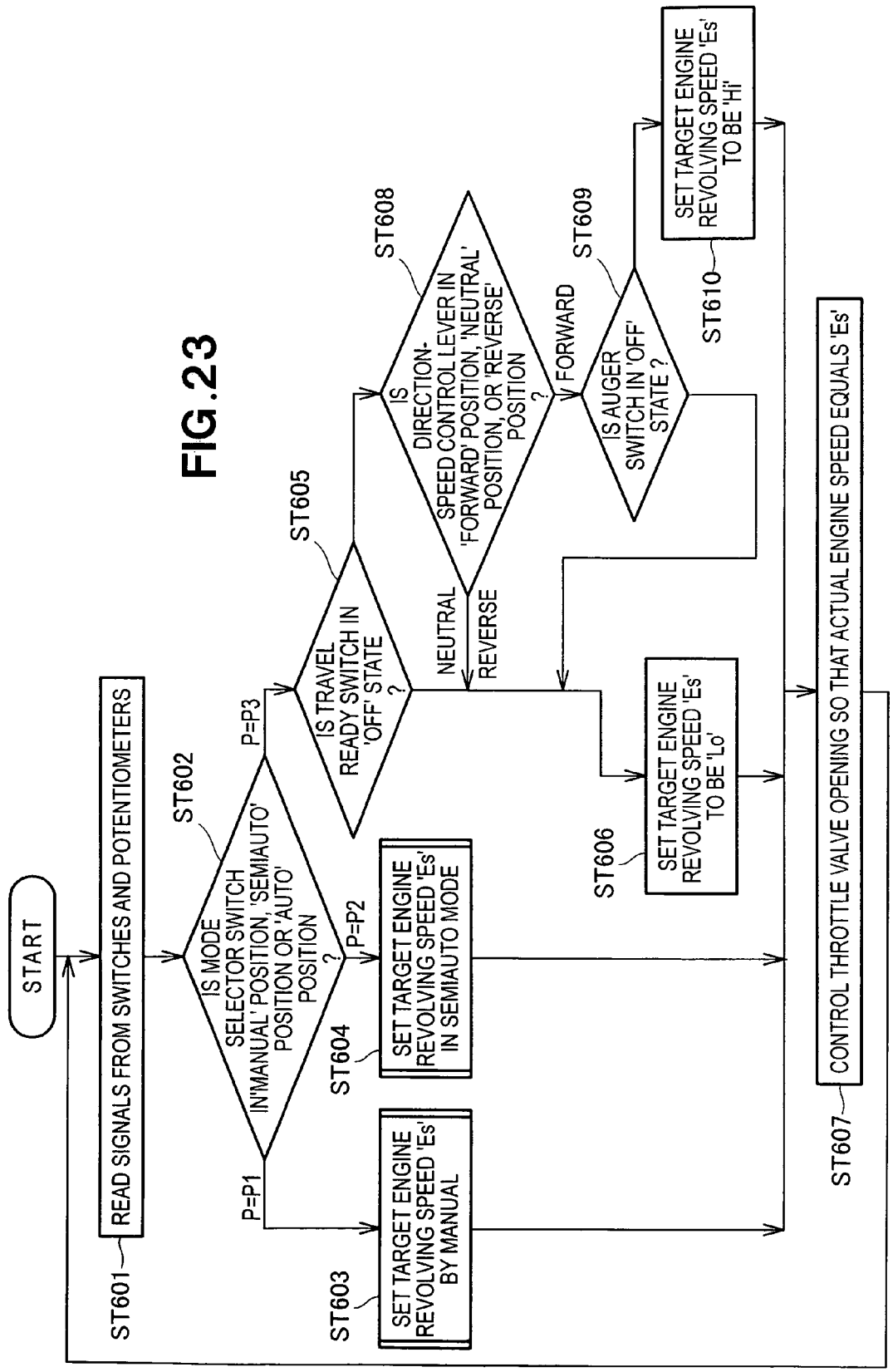
FIG. 23 is a flowchart showing a control routine executed in the control unit to perform a snow removing operation in three different control modes according to the invention.

FIG. 23 is a flowchart showing a control routine executed in the control unit 61 to perform snow removing operation in three different control modes using the snow removing machine 10 of the construction shown in FIGS. 1 to 5. In FIG. 23 the control starts to operate when the main switch 44 is shifted to the ON position and terminates its operation when the main switch 44 is shifted to the OFF position.

Step ST601 reads signals from the respective switches, which include a switch signal from the travel ready switch 42a (FIG. 2) associated with the travel ready lever 42, a switch signal from the mode selector switch 51 and a switch signal from the auger switch (drive-instruction switch) 45, and an output voltage signal from the potentiometer 52a associated with the throttle lever 52 and an output voltage signal from the potentiometer 53a associated with the direction-speed control lever 53.

Subsequently, step ST602 determines a current position P of the mode selector switch 51. If the current position P is the first control position ("MANUAL" position) P1, this means the first control mode ("manual" mode) has been selected. Thus, the control goes on to step ST603. If the current position P of the mode selector switch 51 is the second control position ("POWER" or "SEMIAUTO" position) P2, this means that the second control mode ("power" or "semiauto" mode) has been selected. Thus, the control advances to step ST604. Alternatively, if the current position P is the third control position ("AUTO" position) P3, this means that the third control mode ("auto" mode) has been selected. Thus, the control goes on to step ST605.

Step ST603 allows the operator to set a target engine revolving speed Es of the engine 14 by shifting the throttle lever 52 to a desired position. Subsequently, the control advances to a step ST607.

Step ST604 sets a target engine revolving speed Es in a semiautomatic mode. More specifically, if the auger switch (drive-instruction switch) 45 is in a deactivated or OFF state, the target engine revolving speed Es is set to be a given minimum revolving speed set in advance in the control unit 61. Alternatively, if the auger switch (drive-instruction switch) 45 is in an activated or ON state, the target engine revolving speed Es is set by shifting the throttle lever 52 to a desired position in the same manner as done in ST603. Then, the control goes on to step ST607.

Step ST605 determines whether or not the travel ready switch 42a is in the OFF state. If the determination is affirmative (YES), this means that the travel ready lever 42 is being released from gripping by the human operator, and the control advances to step ST606. Alternatively, if the determination at ST605 is negative (NO), the control goes on to step ST608.

Step ST606 sets the target engine revolving speed Es of the engine 14 to be a given minimum revolving speed Lo, which is set in advance in the control unit 61 as a target engine revolving speed in a work-preparation operation range. The minimum revolving speed Lo is determined such that the engine 14 while running at this minimum speed Lo is still able to generate engine power, which is large enough to perform a work-preparing operation in which the engine power is used to control all electric systems of the snow removing machine 10 and charge the battery 62 with the snow removing unit 13 kept in the deactivated state.

Step ST607 controls the opening of the throttle valve 71 so that an actual revolving speed of the engine 14 equals the target engine revolving speed Es set for each selected control mode. To this end, the control motor 72 incorporated in the electronic governor 65 (FIG. 2) is operated to adjust the opening of the throttle valve 71 so that an offset of the actual engine revolving speed from the target engine revolving speed Es becomes zero. Subsequently, the control returns to step ST601.

Step ST608 determines a current position of the direction-speed control lever 53. If the direction-speed control lever 53 is currently disposed in the neutral position, it is determined that deactivating control is to be achieved. Thus, the control goes on to step ST606. Alternatively, if the direction-speed control lever 53 is currently disposed in a forward travel position, it is determined that forward travel control is to be achieved. Thus, the control advances to step ST609. Yet alternatively, if the direction-speed control lever 53 is currently disposed in a reverse position, it is determined that reverse travel control is to be achieved. Thus, the control goes on to ST606.

Step ST 609 determines whether or not the auger switch (drive-instruction switch) 45 is in the OFF state. If the determination is affirmative (YES), the control advances to ST606. Alternatively, if the determination is negative (NO), the control goes on to step ST610.

Step ST610 sets the target engine revolving speed Es of the engine 14 to be a given maximum revolving speed Hi, which is set in advance in the control unit 61 as a target engine revolving speed in the snow-removing operation range. The maximum engine revolving speed Hi is determined such that the engine 14 while running at this maximum speed Hi is able to generate engine power, which is sufficient for the snow removing unit 13 to achieve a snow removing operation smoothly and reliably.

As just described above with reference to FIG. 23, the control unit 61 has a function to increase the revolving speed of the engine 14 up to the snow-removing operation range (ST610) if the mode selector switch 44 has been set to the "AUTO" position (ST602), the direction-speed control lever 53 has been shifted from the neutral position toward the forward travel position (ST608), and the auger switch (drive-instruction switch) 45 is in the ON state (ST609).

With the mode selector switch 51 set in the AUTO position to perform automatic control of the revolving speed of the engine 14 and the travel speed of the machine body 19, the engine revolving speed is increased up to the snow-removing operation range automatically when the auger switch (drive-instruction switch) 45 is activated with the direction-speed control lever 53 set in a forward travel position. Thus, the snow removing machine 10 starts traveling forward while driving the snow removing unit 13 by the engine 14 running at a higher speed in the snow-removing operation range. In this instance, however, since the control does not require a separate operation by the human operator to shift the throttle lever 52 in a direction to enlarge the throttle opening, the snow removing operation can be achieved with improved efficiency.

The foregoing function of the control unit 61 to increase the engine revolving speed up to the snow-removing operation range is disabled when the travel ready switch 42a is in the OFF or deactivated state (i.e., when the travel ready lever (deadman's lever) 42 is released from gripping by the human operator). By thus disabling the engine speed increasing function of the control unit 61, it is possible to save the fuel cost and extend the service life of the engine 14.

Figure 24:
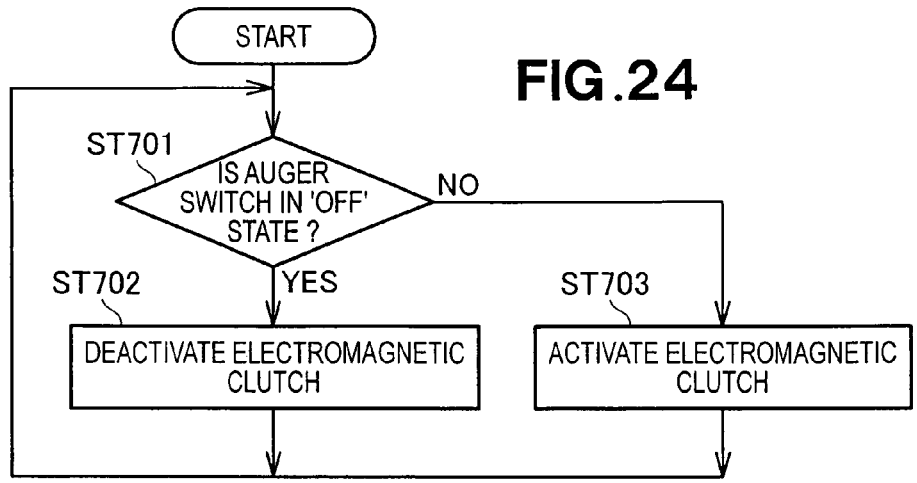
FIG. 24 is a flowchart showing a control routine executed in the control unit to perform continuous monitoring of the ON/OFF state of an auger switch of the snow removing machine.

FIG. 24 is a flowchart showing a control routine executed in the control unit 61 to perform continuous monitoring of the state of the auger switch (drive-instruction switch) 45.

Step ST701 determines whether the auger switch 45 is in a OFF or deactivated state. If the determination at ST701 is affirmative (YES), the control advances to step ST702. Alternatively, if the determination at ST701 is negative (NO), the control goes on to step ST703.

Step ST702 deactivates the electromagnetic clutch 31 to place the same in an OFF or disengaged state. After that, the control returns to ST701.

Step ST703 activates the electromagnetic clutch 31 to thereby place the same in an ON or engaged state. Then, the control returns to ST701.

Figure 25:
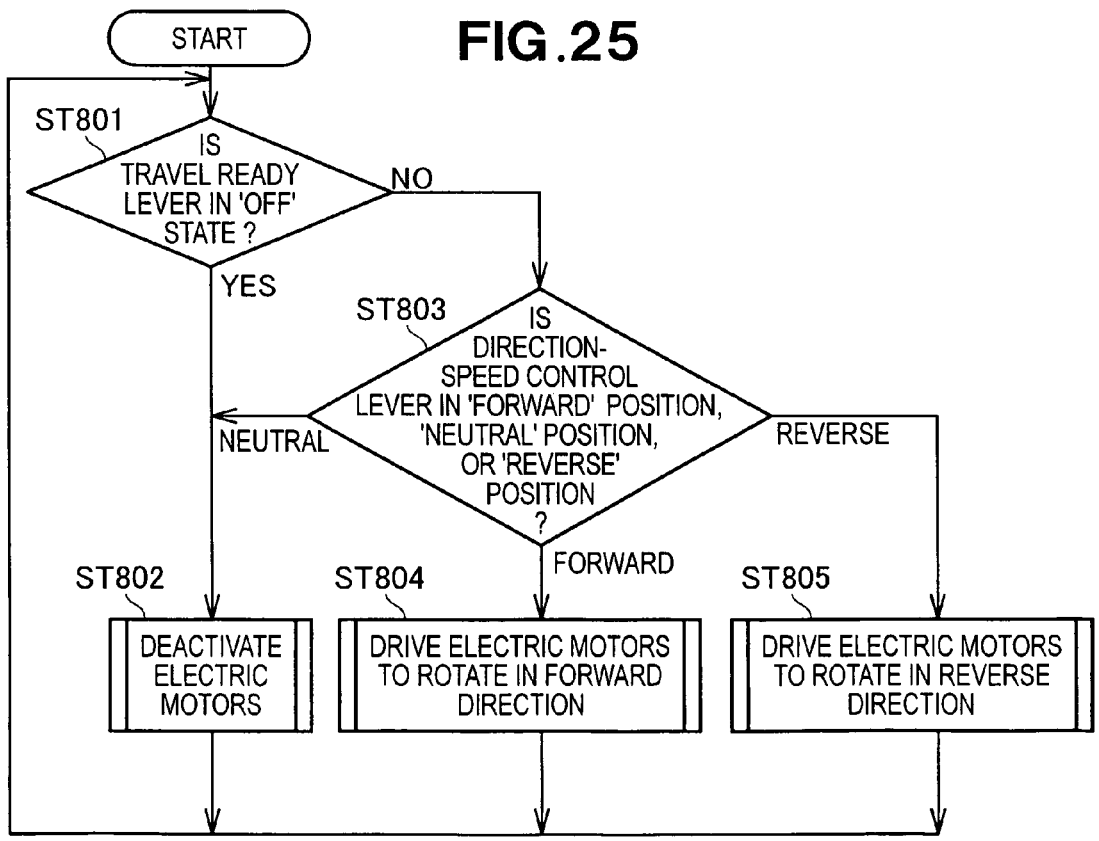
FIG. 25 is a flowchart showing a control routine executed in the control unit to perform continuous monitoring of the state of a travel ready lever of the snow removing machine.

FIG. 25 is a flowchart showing a control routine executed in the control unit 61 to perform continuous monitoring of the state of the travel ready lever 42.

Step ST801 determines whether or not the travel ready lever 42 is in an OFF or released state. If the determination at ST801 is affirmative (YES), the control advances to step ST802. Alternatively, if the determination at ST801 is negative (NO), the control goes on to step ST803.

Step ST802 deactivates the electric motors 21L and 21R or keeps the deactivated state of the electric motors 21L and 21R. Subsequently, the control returns to ST801.

Step ST803 determines a current position of the direction-speed control lever 53. If the direction-speed control lever 53 is currently disposed in the neutral position, this means that deactivating control is to be executed. Thus, the control goes on to ST802. If the direction-speed control lever 53 is currently disposed in a forward travel position, this means that forward travel control is to be executed. Thus, the control advances to step ST804. Alternatively, the direction-speed control lever 53 is currently disposed in a reverse position, this means that reverse travel control is to be executed. Thus, the control goes on to step ST805.

Step ST804 drives the electric motors 21L and 21R to rotate in a forward direction so that the snow removing machine travel in a forward direction. The control then returns to ST801.

Step ST805 drives the electric motors 21L and 21R to rotate in a reverse or backward direction so that the snow removing machine 10 travels in a backward direction. The control then returns to ST801.

Figure 26:
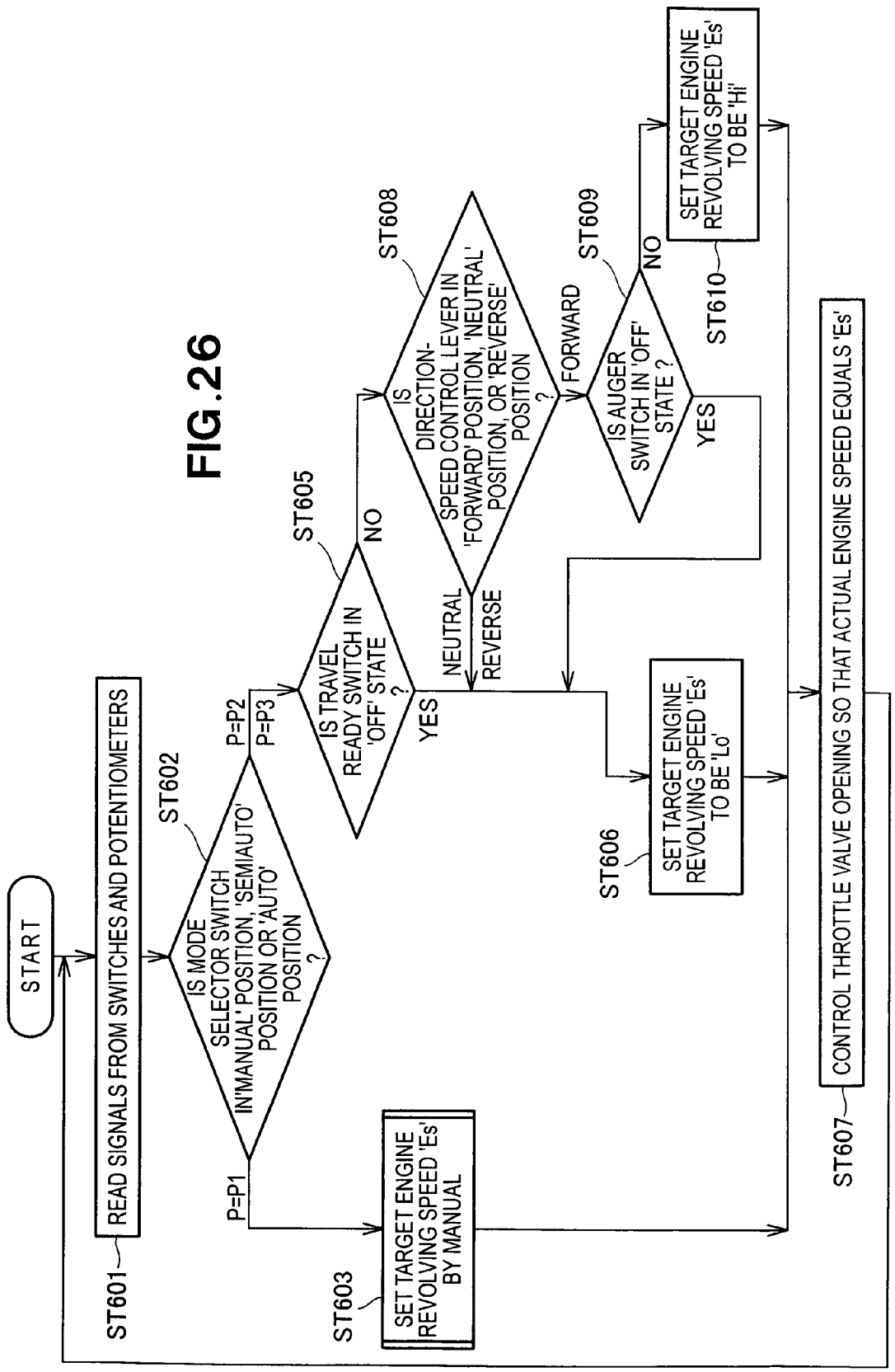
FIG. 26 is a flowchart similar to the one shown in FIG. 23, but showing a modified control routine according to the invention.
Figure 27:
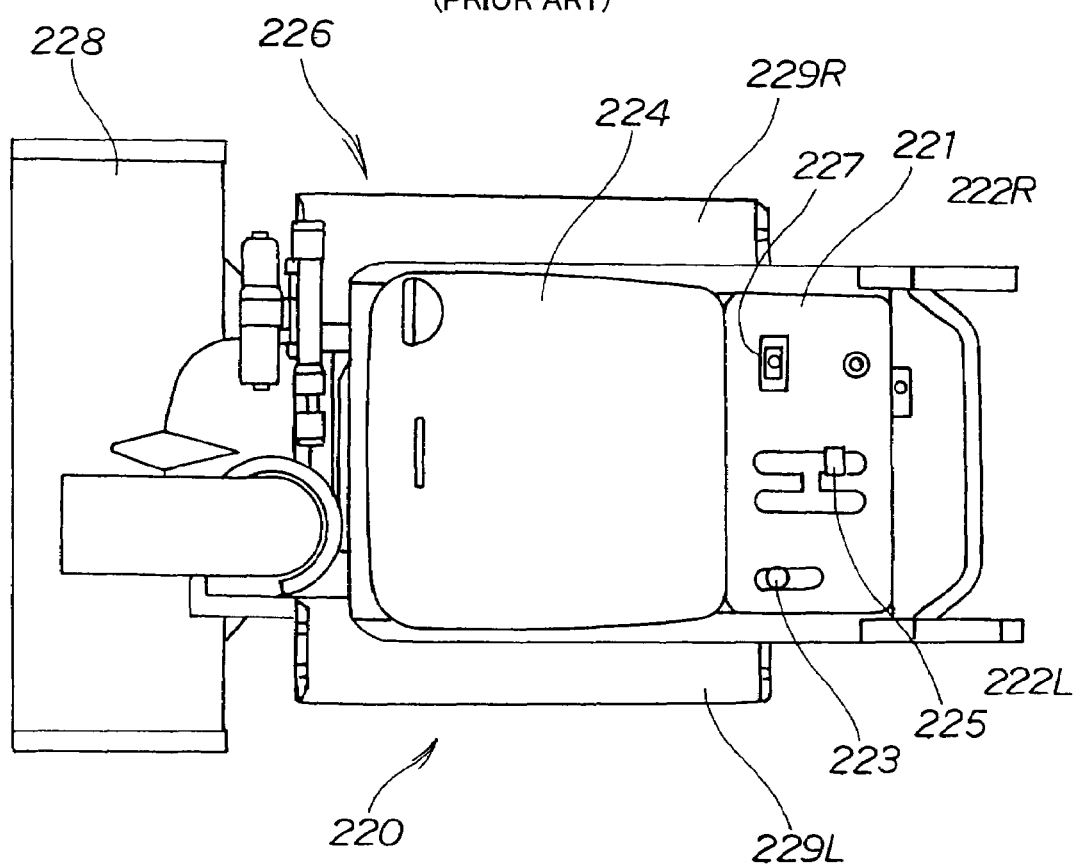
FIG. 27 is a schematic plan view of a conventional snow removing machine.

The control routine shown in FIG. 23 may be modified as shown in FIG. 26. In the modified control routine shown in FIG. 26, if the determination at ST602 shows that the mode selector switch 51 is set in the second control position ("POWER" or "SEMIOUTO" position) P2 to perform control in the "POWER" or "SEMIOUTO" control mode, the control goes on to ST605 in the same manner as done in the "AUTO" control mode. Accordingly, in the "POWER" or "SEMIOUTO" control mode, the engine revolving speed is increased up to the snow-removing operation range automatically when the auger switch (drive-instruction switch) 45 is activated with the direction-speed control lever 53 set in a forward travel position. Automatic increase in the engine revolving speed does take place if the travel ready lever 42 is in the OFF or released state.

The snow removing unit 13 of the snow removing machine 10 should by no means be limited to the so-called "auger-type" including an auger and a blower in combination as in the illustrated embodiments but may include other types of snow removing units provided that the load on the snow removing unit increase with the travel speed of the snow removing machine 10.

Furthermore, a power source for driving the travel units 11L and 11R should not be limited to the electric motors 21L and 21R as in the illustrated embodiments but may include a hydrostatic continuously variable transmission (not shown) that is arranged to transmit power from the engine 14 to the travel units 11L and 11R. The hydrostatic continuously variable transmission is per se known and has an input shaft for receiving the engine power and left and right output shafts capable of rotating in forward and reverse directions at continuously variable speeds and stopping independently from one another in response to the engine power received from the input shaft.

The electrohydraulic cylinder actuators used as the pivot drive mechanism 16 and the roll drive mechanism 38 may be replaced by conventional hydraulic cylinder actuators (not shown) drivable under control of a separate hydraulic unit.

Obviously, various minor changes and modifications of the present invention are possible in the light of the above teaching. It is therefore to be understood that within the scope of the appended claims the invention may be practiced otherwise than as specifically described.

What is claimed is:

1. A walk-behind self-propelled snow-removing machine comprising:
    a machine body having a front end and a rear end;
    a snow-removing unit disposed at the front end of the machine body for performing a snow removing operation;
    an engine disposed on the machine body for driving the snow-removing unit;
    a traveling unit disposed on the machine body and drivable for causing the machine body to travel;
    left and right operation handlebars extending upwardly and rearwardly from a rear portion of the machine body, the operation handlebars being disposed one on each side of a longitudinal centerline of the machine body;
    a control unit for controlling operations of the snow removing unit and the traveling unit;
    an operating section mounted to extend between the left and right operation handlebars for operation by a human operator to provide instructions to the control unit;
    a snow-removing-unit posture control member disposed on the operating section at one side of the longitudinal centerline of the machine body for operation by the human operator to control a posture of the snow removing unit;
    a travel ready lever pivotally mounted on one of the left and right operation handlebars at the other side of the longitudinal centerline of the machine body for being gripped by the human operator to place the machine body in a ready-to-travel condition, the travel ready lever, when released from gripping by the human operator, automatically placing the machine body in an unable-to-travel condition; and
    a mode selector switch disposed on the operating section and located forwardly of the travel ready lever for operation by the human operator to select one snow removing operation mode from among plural alternative snow removing operation modes that are set in advance in the control unit on the basis of a combination of a travel speed of the machine body, a revolving speed of the engine, and an opening of a throttle valve associated with the engine.

2. A walk-behind self-propelled snow-removing machine according to claim 1; further comprising an adjusting member disposed on the operating section and located near the mode selector switch for operation by the human operator to adjust power from the engine and a snow throwing distance of the snow removing unit.

3. A walk-behind self-propelled snow-removing machine according to claim 1; wherein the adjusting member is disposed between the mode selector switch and the travel ready lever when viewed in a longitudinal direction of the machine body.

4. A walk-behind self-propelled snow-removing machine according to claim 1; wherein the plural alternative snow removing operation modes comprise a first control mode in which control is performed through manual operation by the human operator based on the revolving speed of the engine, a second control mode in which control is performed so that the travel speed of the machine body decreases moderately with respect to an increase in the opening of the throttle valve, and a third control mode in which control is performed so that the travel speed of the machine body decreases with respect to an increase in the opening of the throttle valve at a greater extent than is achieved in the second control mode.

5. A walk-behind self-propelled snow-removing machine according to claim 4; wherein the first control mode is arranged so that the rate of decrease of the travel speed of the machine body is set to increase with a decrease in the revolving speed of the engine; wherein the second control mode is arranged so that the rate of decrease of the travel speed of the machine body, which increases with an increase in the opening of the throttle valve, is set to be smaller in a first throttle opening range defined between a fully closed position and a partly open first intermediate position disposed between the fully closed position and a fully open position of the throttle valve, than in a second throttle opening range defined between the first intermediate position and the fully open position of the throttle valve; and wherein the third control mode is arranged so that the rate of decrease of the travel speed of the machine body, which increases with an increase in the opening of the throttle valve, is set to be larger in a first throttle opening range defined between the fully closed position and a partly open second intermediate position disposed between the fully closed position and a fully open position of the throttle valve, than in a second throttle opening range defined between the second intermediate position and the fully open position of the throttle valve.

6. A walk-behind self-propelled snow-removing machine according to claim 4; further comprising a battery for supplying electric power to the travel unit; wherein the plural alternative snow removing operation modes selectable by the mode selector switch further comprise a fourth control mode in which control is performed so that the travel unit is operated only by electric power supplied from the battery while the engine is in a deactivated state.

7. A walk-behind self-propelled snow-removing machine according to claim 6; further comprising a main switch having plural alternative switching positions manually selectable by the human operator, the switching positions including an ON position to activate all electric systems of the snow removing machine and an OFF position to deactivate the electric systems of the snow removing machine; wherein the control unit has a function to deactivate the engine or keep a deactivated state of the engine only if the main switch has been shifted to the ON position and the operation mode has been shifted to the fourth control mode through manual operation of the mode selector switch by the human operator.

8. A walk-behind self-propelled snow-removing machine according to claim 7; wherein the control unit further has a function to automatically activate the engine when the operation mode is shifted from the fourth control mode to another control mode by means of the mode selector switch.

9. A walk-behind self-propelled snow-removing machine according to claim 7; wherein the main switch further has a START position to instruct the control unit to activate the engine; and wherein the control unit further has a function to activate the engine only if the operation mode has been shifted from the fourth control mode to another control mode by means of the mode selector switch and the main switch has been shifted to the START position.

10. A walk-behind self-propelled snow-removing machine according to claim 1; wherein the operating section includes a direction-speed control lever manually operable to undergo reciprocating movement between a forward travel position and a reverse travel position past a neutral position for adjustably setting a travel direction and a travel speed of the machine body, and a drive-instruction switch manually operable to provide an instruction to the control unit for enabling transmission of power from the engine to the snow removing unit; wherein the mode selector switch is manually operable to select an automatic position to perform automatic setting of the revolving speed of the engine and the travel speed of the machine body or a manual position to allow the human operator to perform manual setting of the revolving speed of the engine and the travel speed of the machine body; and wherein the control unit has a function to increase the revolving speed of the engine up to a snow-removing operation range if the mode selector switch has been set in the automatic position, the direction-speed control lever has been shifted from the neutral position toward the forward travel position, and the drive-instruction switch is in the ON state.

11. A walk-behind self-propelled snow removing machine according to claim 10; wherein the function of the control unit to increase the revolving speed of the engine up to the snow-removing operation range is disabled if the travel ready lever is released from gripping by the human operator.

12. A walk-behind self-propelled snow removing machine according to claim 1; wherein at least one of the snow removing operation modes comprises a control mode in which control is performed through manual operation by the human operator.

13. A walk-behind self-propelled snow removing machine according to claim 1; wherein the plural alternative snow removing operation modes comprise a first control mode in which the engine revolving speed, throttle opening, and travel speed of the snow removing machine can be set manually by the human operator, a second control mode in which the engine revolving speed and the throttle opening can be set manually by the human operator while the travel speed of the snow removing machine is set automatically, and a third control mode in which the engine revolving speed, throttle opening, and travel speed of the snow removing machine are set automatically.

14. A walk-behind self-propelled snow removing machine according to claim 1; wherein the mode selector switch comprises a multiposition switch arranged to select each of the plural alternative snow removing operation modes.

* * * * *